US012139293B1

(12) United States Patent
Gaydos et al.

(10) Patent No.: US 12,139,293 B1
(45) Date of Patent: Nov. 12, 2024

(54) APPARATUS AND METHOD FOR APPLYING LABELS TO A CUSTOMER CONTAINER FROM A WASTE COLLECTION, DISPOSAL AND/OR RECYCLING VEHICLE

(71) Applicant: WM RECYCLE AMERICA, L.L.C., Houston, TX (US)

(72) Inventors: James L. Gaydos, Columbus, CO (US); Emily Hess, Columbus, CO (US); Madison Grace Holdsworth, Columbus, CO (US); Nathan Bernard Jacoby, Columbus, CO (US); Sadie Jezierski, Columbus, CO (US); Trevor Lynd, Columbus, CO (US); Stacy Katz, Denver, CO (US)

(73) Assignee: WM RECYCLE AMERICA, L.L.C., Houston, TX (US)

( * ) Notice: Subject to any disclaimer, the term of this patent is extended or adjusted under 35 U.S.C. 154(b) by 0 days.

(21) Appl. No.: 18/201,667

(22) Filed: May 24, 2023

Related U.S. Application Data

(63) Continuation of application No. 16/893,821, filed on Jun. 5, 2020, now Pat. No. 11,673,703.

(Continued)

(51) Int. Cl.
*B65C 9/26* (2006.01)
*B65C 1/02* (2006.01)

(Continued)

(52) U.S. Cl.
CPC ................ *B65C 9/26* (2013.01); *B65C 1/021* (2013.01); *B65C 9/0006* (2013.01); *B65C 9/42* (2013.01); *G09F 3/10* (2013.01)

(58) Field of Classification Search
CPC ........... B29C 9/26; B29C 1/021; B29C 9/006; B29C 9/42; G09F 3/10
See application file for complete search history.

(56) References Cited

U.S. PATENT DOCUMENTS

| | | | |
|---|---|---|---|
| 4,612,078 | A | 9/1986 | Karp |
| 5,565,846 | A | 10/1996 | Geiszler et al. |

(Continued)

FOREIGN PATENT DOCUMENTS

| | | |
|---|---|---|
| CN | 206796893 | 12/2017 |
| CN | 107697380 | 2/2018 |

(Continued)

OTHER PUBLICATIONS

Waste Management, Inc. et al.; Waste Management—Customer Communications; Te Ohio State University; 1 page; Apr. 14, 2019; U.S.

(Continued)

*Primary Examiner* — George R Koch
(74) *Attorney, Agent, or Firm* — Greenberg Traurig LLP

(57) ABSTRACT

An apparatus and method are disclosed for applying a sticker label to a waste container during waste collection operations. The apparatus can include an xyz-positioner, and a sticker labeling dispenser, wherein the xyz-positioner is disposed on a waste collection vehicle, and wherein the sticker labeling dispenser is disposed on the xyz-positioner, and wherein the xyz-positioner is configured to move the sticker labeling dispenser along x, y, and z coordinates and into proximity with the waste container during operations of the waste collection vehicle, such that the sticker label can be applied to the waste container.

3 Claims, 25 Drawing Sheets

Related U.S. Application Data

(60) Provisional application No. 62/858,612, filed on Jun. 7, 2019.

(51) Int. Cl.

| | |
|---|---|
| ***B65C 9/00*** | (2006.01) |
| ***B65C 9/42*** | (2006.01) |
| ***G09F 3/10*** | (2006.01) |

(56) References Cited

U.S. PATENT DOCUMENTS

| | | | | |
|---|---|---|---|---|
| 5,610,516 | A * | 3/1997 | Maier | B65F 3/02 324/226 |
| 6,230,780 | B1 | 5/2001 | Rietheimer | |
| 7,674,055 | B2 | 9/2010 | Hiroike et al. | |
| 8,006,734 | B2 | 8/2011 | Hajny et al. | |
| 8,882,955 | B2 | 11/2014 | Brandon et al. | |
| 9,913,429 | B1 | 3/2018 | Stubbs et al. | |
| 11,673,703 | B1 * | 6/2023 | Gaydos | B65C 9/26 156/574 |
| 2007/0102109 | A1 | 5/2007 | Katritzky et al. | |
| 2019/0039772 | A1 * | 2/2019 | Le | B65C 9/02 |
| 2019/0039837 | A1 | 2/2019 | Zhou et al. | |
| 2020/0031513 | A1 * | 1/2020 | Beach | B65C 9/40 |

FOREIGN PATENT DOCUMENTS

| | | |
|---|---|---|
| CN | 108643104 | 10/2018 |
| CN | 109178728 | 1/2019 |

OTHER PUBLICATIONS

Waste Management: Customer Communication; Autumn 2018, Engineering 5901.01 Multidisciplinary Design Capstone; 265 pages; Dec. 7, 2018; U.S.

* cited by examiner

APPARATUS AND METHOD FOR APPLYING LABELS TO A CUSTOMER CONTAINER FROM A WASTE COLLECTION, DISPOSAL AND/OR RECYCLING VEHICLE

RELATED APPLICATIONS

This application is a continuation application of, and claims the benefit of, U.S. application Ser. No. 16/893,821, filed Jun. 5, 2020, now U.S. Pat. No. 11,673,703 B1 which claims the benefit, and priority benefit, of U.S. Provisional Patent Application Ser. No. 62/858,612, filed Jun. 7, 2019, the disclosure and contents of which are incorporated by reference herein in their entirety.

BACKGROUND

Field of the Invention

The presently disclosed subject matter relates to the application of labels to customer containers from a waste collection, disposal or recycling vehicle.

Description of the Related Art

Service providers in the waste collection, disposal and recycling industry often have difficulty handling and removing recycling contamination due to residential customer recycling habits and lack of customer knowledge about proper recycling procedures.

It has been determined that an effective way to communicate with customers and reduce residential recycling contamination is to tag residential recycling carts. These tags can inform the users on, for example, what can and cannot be recycled. Unfortunately, applying tags to recycling carts manually can be costly and time consuming.

Currently, there is no easy and cost effective way to tag customer carts in instances where, for example, a container is contaminated, when the workers do not want to service the cart, when the workers want to remove the container, or when the workers want to charge the customer after a certain number of contamination events have occurred.

Improvements in this field of technology are desired.

SUMMARY

An apparatus and method are disclosed for applying a sticker label to a waste container during waste collection operations. In certain aspects, the apparatus can include an xyz-positioner, and a sticker labeling dispenser, wherein the xyz-positioner is disposed on a waste collection vehicle, and wherein the sticker labeling dispenser is disposed on the xyz-positioner, and wherein the xyz-positioner is configured to move the sticker labeling dispenser along x, y, and z coordinates and into proximity with the waste container during operations of the waste collection vehicle, such that the sticker label can be applied to the waste container. In certain embodiments, the apparatus can further include a lid containment arm disposed on the xyz-positioner and configured to contact the lid of the waste container and keep the lid in a closed position, such that the sticker label can be applied to both the lid and the side wall of the waste container. In certain embodiments, the waste container comprises one or more of a garbage container, a recycling container, an organics container, and a yard waste container.

While the presently disclosed subject matter will be described in connection with the preferred embodiment, it will be understood that it is not intended to limit the presently disclosed subject matter to that embodiment. On the contrary, it is intended to cover all alternatives, modifications, and equivalents, as may be included within the spirit and the scope of the presently disclosed subject matter as defined by the appended claims.

BRIEF DESCRIPTION OF THE DRAWINGS

A better understanding of the presently disclosed subject matter can be obtained when the following detailed description is considered in conjunction with the drawings and figures herein, wherein.

While the presently disclosed subject matter will be described in connection with the preferred embodiment, it will be understood that it is not intended to limit the presently disclosed subject matter to that embodiment. On the contrary, it is intended to cover all alternatives, modifications, and equivalents, as may be included within the spirit and the scope of the presently disclosed subject matter as defined by the appended claims.

DETAILED DESCRIPTION

The presently disclosed subject matter relates generally to an apparatus and method for applying labels to customer carts or containers from a waste collection, disposal or recycling vehicle.

In certain illustrative embodiments, an apparatus and method are disclosed herein for applying labels to contaminated recycling carts in order to communicate with the users of those carts. Using this mechanism can inform customers of proper recycling habits and allow for residential communities to decrease their footprint on contamination entering the recycling facilities. As a result of effective communication, the customers would be more likely to help prevent the contamination of recycling in residential areas. The presently disclosed apparatus and method can also make sorting operations at the recycling plant easier. By lowering the amount of contamination in the recycling, the plant will require less manual labor and/or mechanical solutions to remove contaminants, will be less likely to experience downtime events, the potential for products to become contaminated is reduced and costs will be greatly reduced.

Figure 1:
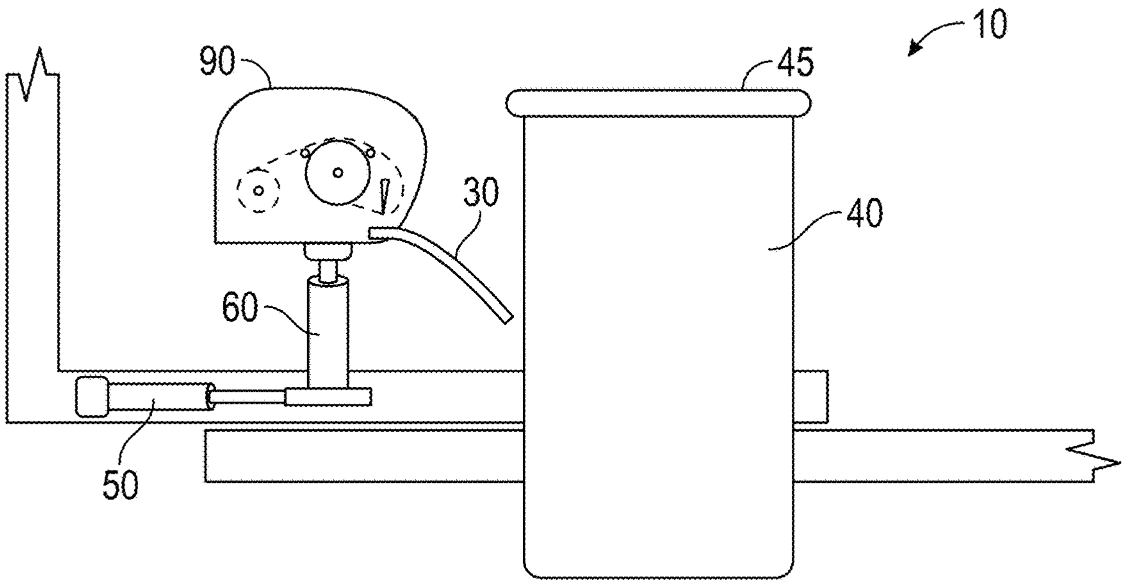
FIG. 1 is an illustration of an apparatus for applying labels to carts such as contaminated recycling carts in accordance with an illustrative embodiment of the presently disclosed subject matter.

In certain illustrative embodiments, an apparatus and method for applying large labels to carts such as contaminated recycling carts in order to communicate with the users of those carts are disclosed. A labeled sketch of a basic apparatus 10 in accordance with certain illustrative embodiments can be seen in, e.g., FIGS. 1-3 herein. As used herein, the term labels 20 can include, for example, sticker labels or other types of labels, tags, or other similar means of communicating with customers. Apparatus 10 can be mounted or otherwise disposed on a waste vehicle 5 as utilized in the waste collection, disposal and recycling industry.

In certain illustrative embodiments, the operation of apparatus 10 is as follows. Apparatus 10 can include a sticker head assembly 90. A flexible piece, or tongue 30, can be used to apply a sticker 20 and slide up and over the top of the recycling cart 40 and its lid 45, and/or to the side of the cart 40, much like how a large tongue might lick up the side of the recycling cart 40. First, a sticker 20 is rolled out onto the flexible tongue 30 with its adhesive backing 35 being pulled off to expose the adhesive. Next, a horizontal linear actuator 50 pushes the apparatus 10 sideways until the sticker 20 is pressed against the side of the cart 40 by the flexible tongue 30. A vertical linear actuator 60 then pushes upward sliding the flexible tongue 30 up the side of the cart 40 as the rest of the sticker 20 continues to roll out and onto the side of the cart 40. Once the flexible tongue 30 reaches the top of the lid 45, the compression on the tongue 30 is released and the tongue 30 flicks out and over the top of the lid 45 of the recycling cart 40. This motion presses the rest of the sticker 20 onto the lid 45. Following this, the vertical linear actuator 60 pulls downwards to press the other side of the flexible tongue 30 on top of the lid 45 to ensure that the sticker 20 is fully applied to the top of the lid 45. The horizontal actuator 50 then retracts pulling the apparatus 10 away from the recycling cart 40, the vertical actuator 60 retracts to position the tongue 30 for the next application, and the beginning of the next sticker 20 is rolled out onto the flexible tongue 30.

Figure 2:
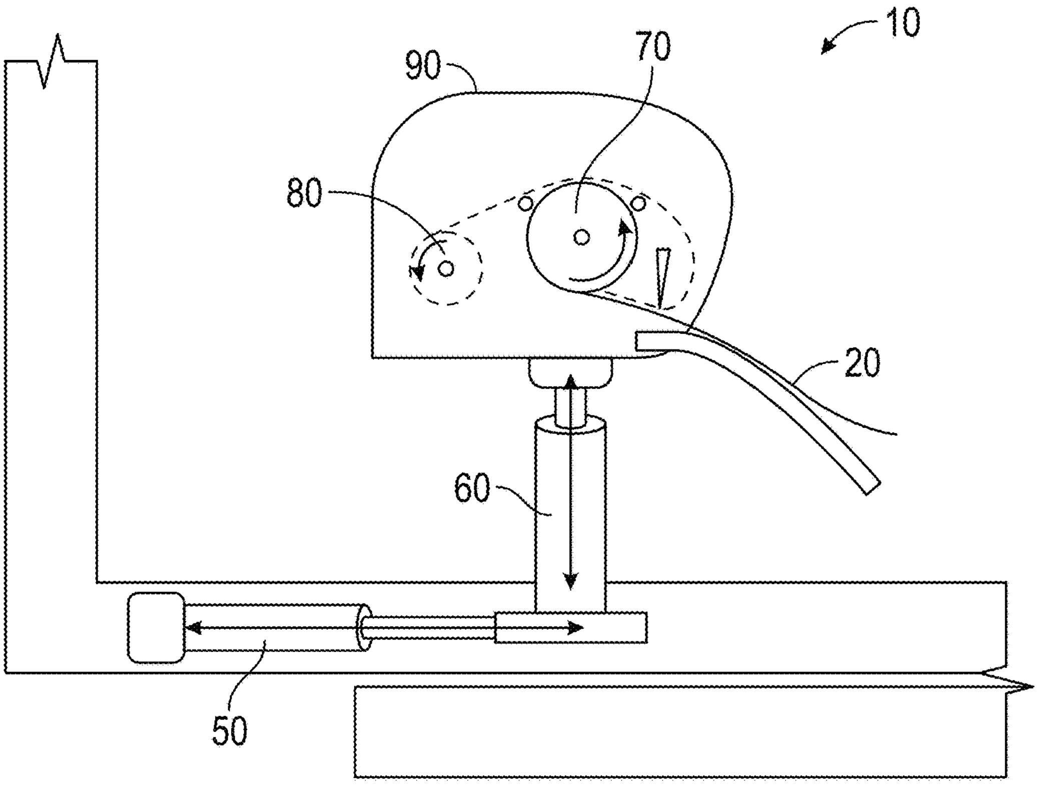
FIG. 2 is an illustration of linear actuators and rotational actuators for an apparatus for applying labels to carts such as contaminated recycling carts in accordance with an illustrative embodiment of the presently disclosed subject matter.

Referring now to FIG. 2, two linear actuators, the horizontal linear actuator 50 and the vertical linear actuator 60, and two rotational actuators, a sticker actuator 70 and an adhesive backing actuator 80, for the presently disclosed apparatus and method are shown. The linear actuators 50, 60 can be, for example, pneumatic cylinders. In cases where the waste vehicle 5 has a pneumatic system operating in the range of around 75 psi to 100 psi, the linear actuators 50, 60 would not require their own compressor and pneumatic actuation can be rapid. In terms of rotational actuators 70, 80, stepper motors can be used to unroll the stickers 20 and roll up the adhesive backing 35 in order for rotational actuation to be precise. Extension of the sticker 20 on to the flexible tongue 30 requires a precise amount of sticker extension in certain illustrative embodiments, as too little or too much extension can hinder the ability to apply the sticker 20 to the side of the cart 40.

Figure 3:
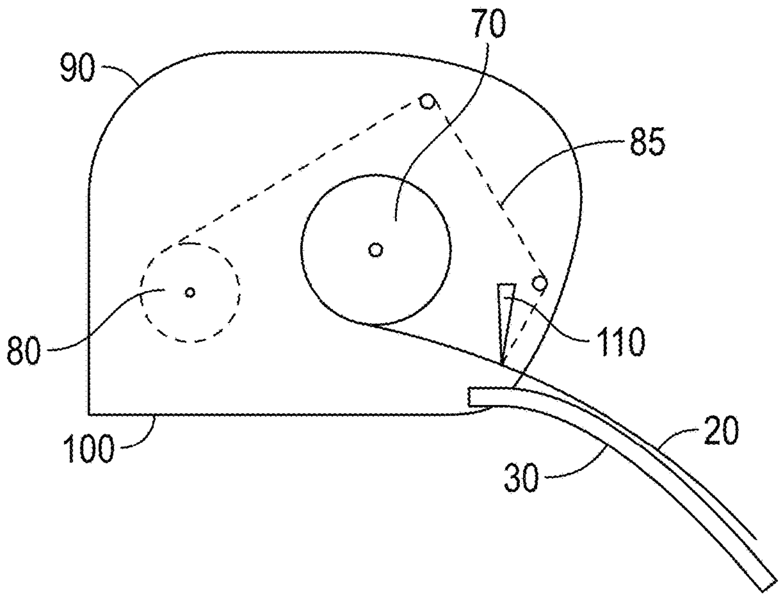
FIG. 3 is an illustration of a sticker head assembly for an apparatus for applying labels to carts such as contaminated recycling carts in accordance with an illustrative embodiment of the presently disclosed subject matter.

FIG. 3 is a drawing of the sticker head assembly 90 according to certain illustrative embodiments. Sticker head assembly 90 can, in certain illustrative embodiments, remove the protective adhesive backing 85 on the adhesive side of the sticker 20 from the sticker 20 itself. Pulling the adhesive backing 85 away from the sticker 20 at a sharp angle in the opposite direction of the sticker 20 is a preferred method of removing the backing 85. In certain illustrative embodiments, sticker head assembly 90 can include an outer housing 100 that completely or partially surrounds the sticker actuator 70, the adhesive backing actuator 80 and a separator such as separating edge wedge 110. Separating edge wedge 110 can be a metal plate with a smooth edge, over which the adhesive backing 85 is pulled and removed from the sticker 20 as sticker 20 is delivered from sticker actuator 70, so the sticker 20 can be deposited onto tongue 30 while backing 85 can be delivered to adhesive backing actuator 80.

Figure 4:
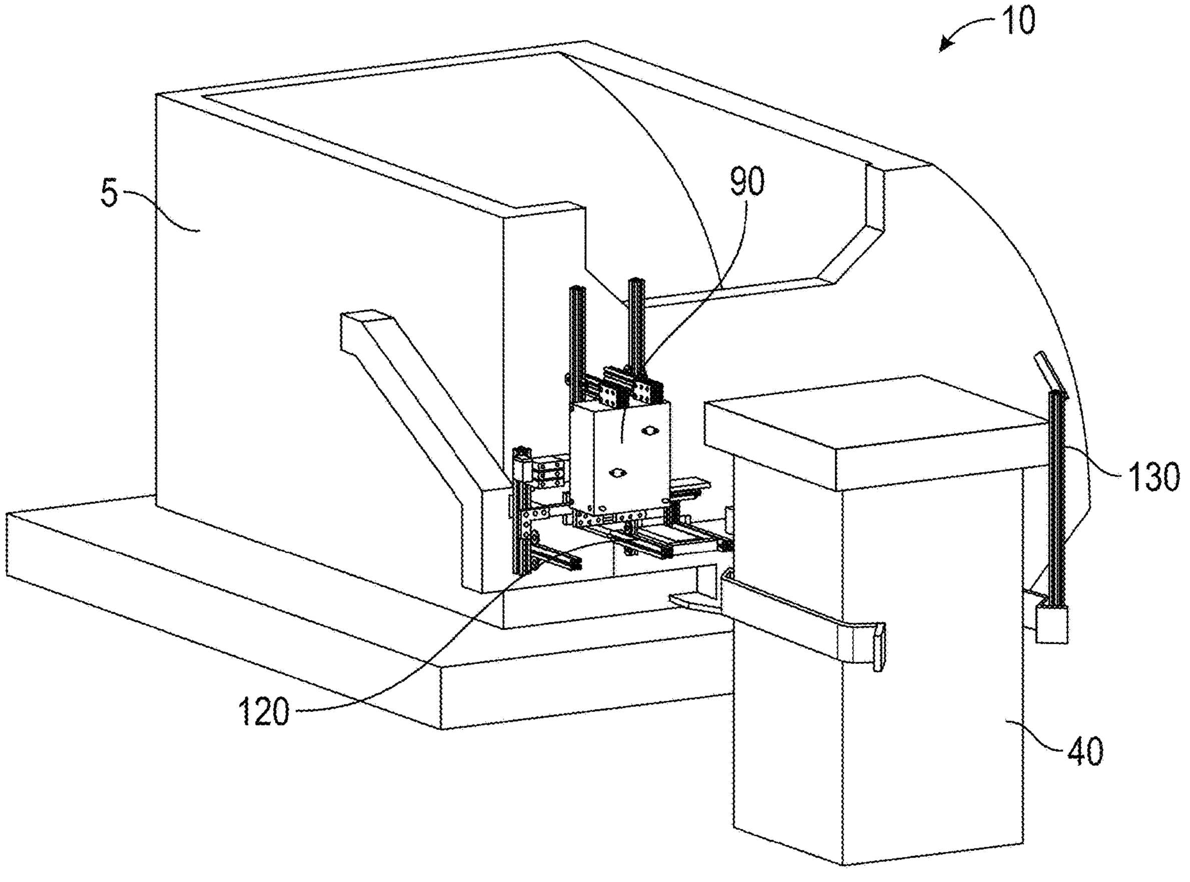
FIG. 4 is an apparatus for applying labels to carts such as contaminated recycling carts and attached to the side of a waste container collection vehicle in accordance with illustrative embodiments of the presently disclosed subject matter.
Figure 4A:
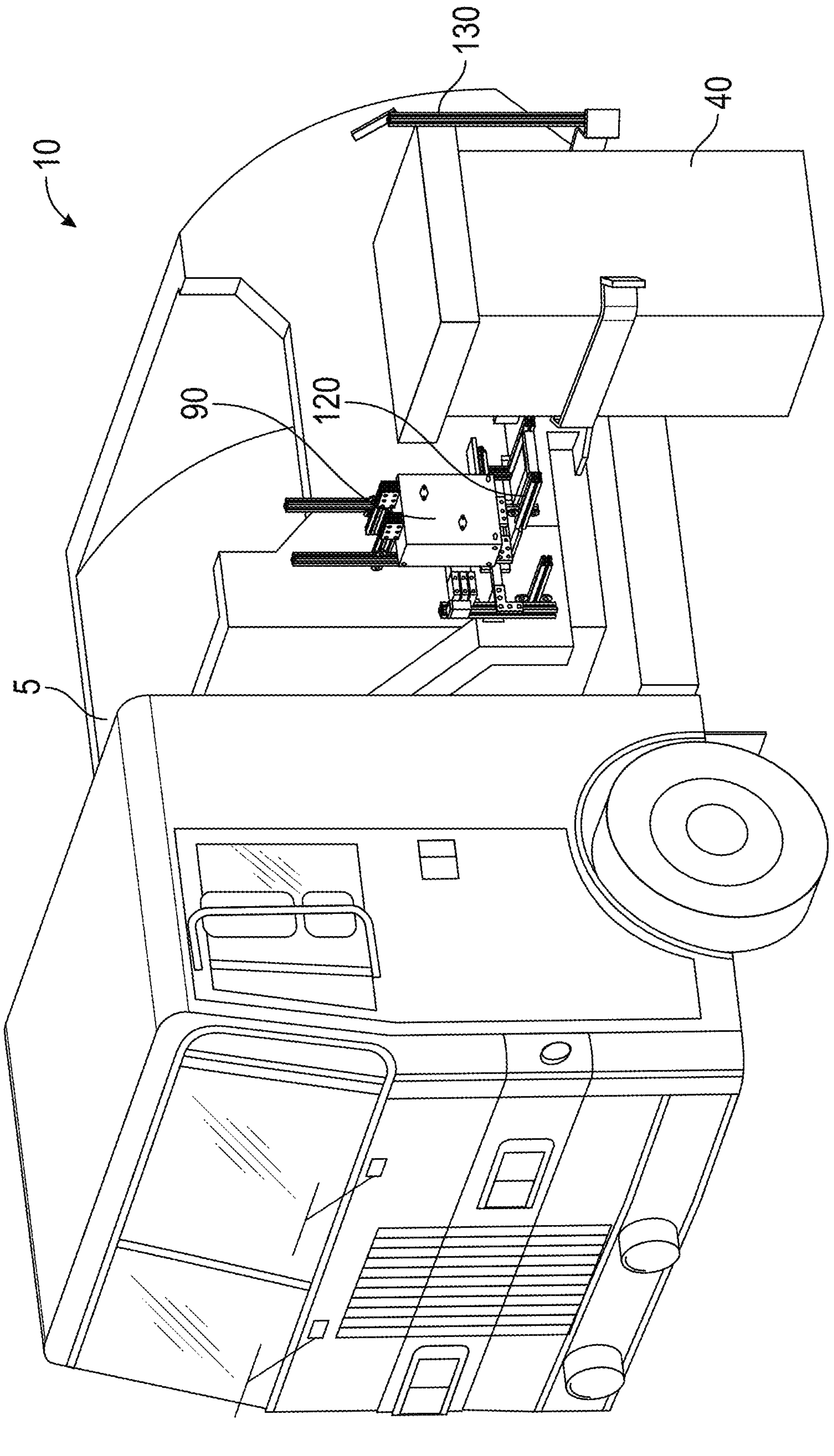
FIG. 4A is an apparatus for applying labels to carts such as contaminated recycling carts and attached to a waste container collection vehicle in accordance with illustrative embodiments of the presently disclosed subject matter.
Figure 5:
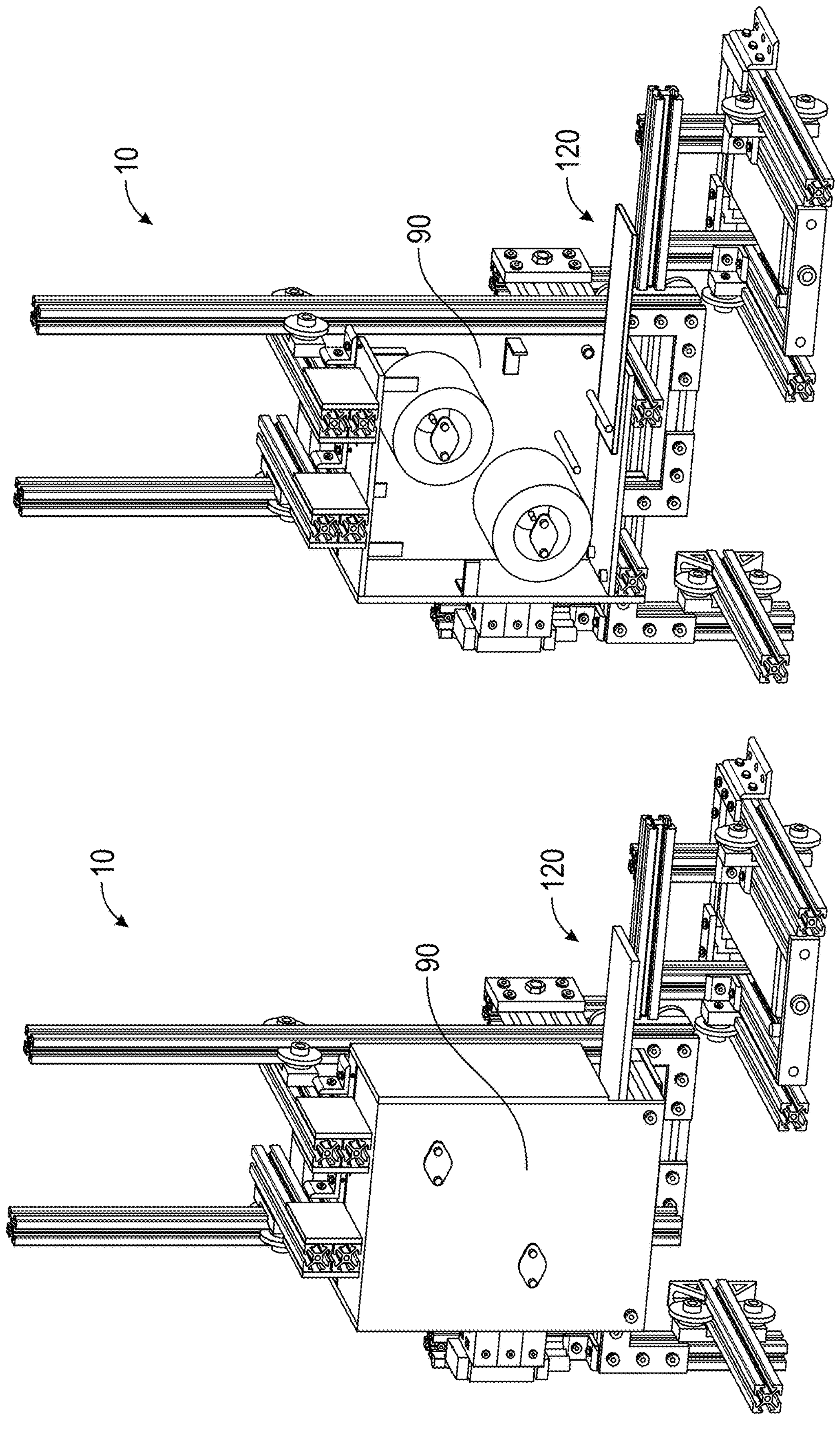
FIG. 5 is a side-by-side image of an apparatus of FIG. 1 with and without the front and right side plate of the sticker assembly removed in accordance with an illustrative embodiment of the presently disclosed subject matter.

Images of the apparatus 10 according to certain illustrative embodiments can be seen in FIG. 4 and FIG. 5. In certain illustrative embodiments, the apparatus 10 has three main components: movement assembly 120, sticker head assembly 90, and a lid stick assembly 130. Certain other embodiments would not include lid stick assembly 130. In FIG. 4, the apparatus 10 as it would be attached to the side of a waste container collection vehicle 5 is displayed. An additional view of apparatus 10 on waste container vehicle 5 is displayed in FIG. 4A. The waste collection vehicle 5 could be, for example, an automatic side loader or a front end loader, although other types of collection vehicles could also be utilized. In FIG. 5, side-by-side images of the apparatus 10 are displayed wherein the image on the left displays what the apparatus 10 would look like normally, and the image on the right displays the apparatus 10 with the front and right side plate of the sticker assembly 90 removed. In certain illustrative embodiments, one or more additional horizontal actuators 50 can be provided that move the sticker assembly 90 further out and away from the body of the waste vehicle 5. This illustrative embodiment may be utilized to accommodate any gap that exists between the system mounting point on the waste vehicle 5 and the recycling cart 40.

Figure 6:
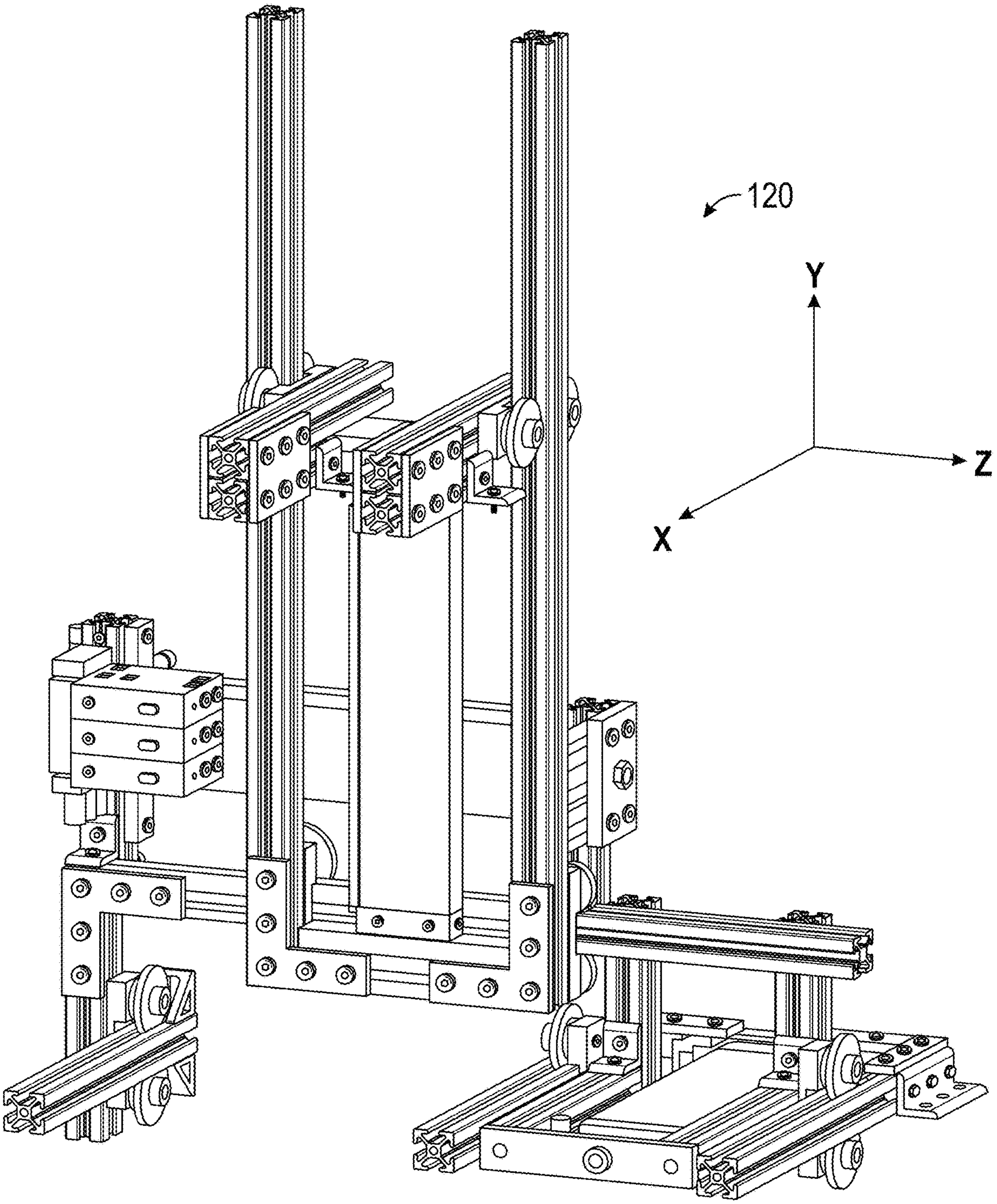
FIG. 6 is an illustration of the movement assembly of the apparatus of FIG. 1 in accordance with an illustrative embodiment of the presently disclosed subject matter.

Movement Assembly: An illustrative embodiment of the movement assembly 120 of apparatus 10 can be seen in FIG. 6. In certain illustrative embodiments, the movement assembly 120 can be an XYZ positioner, also known as a three-axis positioner, which is a machine that can move and position an item in a working area or space defined by three-dimensional cartesian coordinates. Typically, an XYZ or three-axis positioner has components oriented along three mutually perpendicular or orthogonal axes, with each axis having components that are fixed or movable with respect to that axis. In certain illustrative embodiments, movable components of the X axis can move and position all of the Y axis components, along with all of the Z axis components, in the plus or minus X direction. Movable components of the Y axis can move and position all of the Z axis components in the plus or minus Y direction. Movable components of the Z axis can move and position an item in the plus or minus Z direction. Movement along the axes may be driven manually or by one or more motors, and may be controlled manually (such as by a remote control) or automatically (such as by programmed activation). It is to be understood that the present invention is not limited to the illustrative embodiment described above, nor or the xyz coordinates shown in FIG. 6 limiting with respect to the particular structure and orientation of movement assembly 120 shown in FIG. 6.

In certain illustrative embodiments, the movement assembly 120 is the mechanism used to position the sticker head assembly 90 relative to the recycling cart 40, and can be collapsible to facilitate transport and arm movement of waste vehicle 5.

In certain illustrative embodiments, there are at least three functional components of the movement assembly 120, including pneumatic actuation, framing, and connecting plates. All of these components can come together to cause the combination of linear movements to move the sticker head assembly 90.

Figure 7:
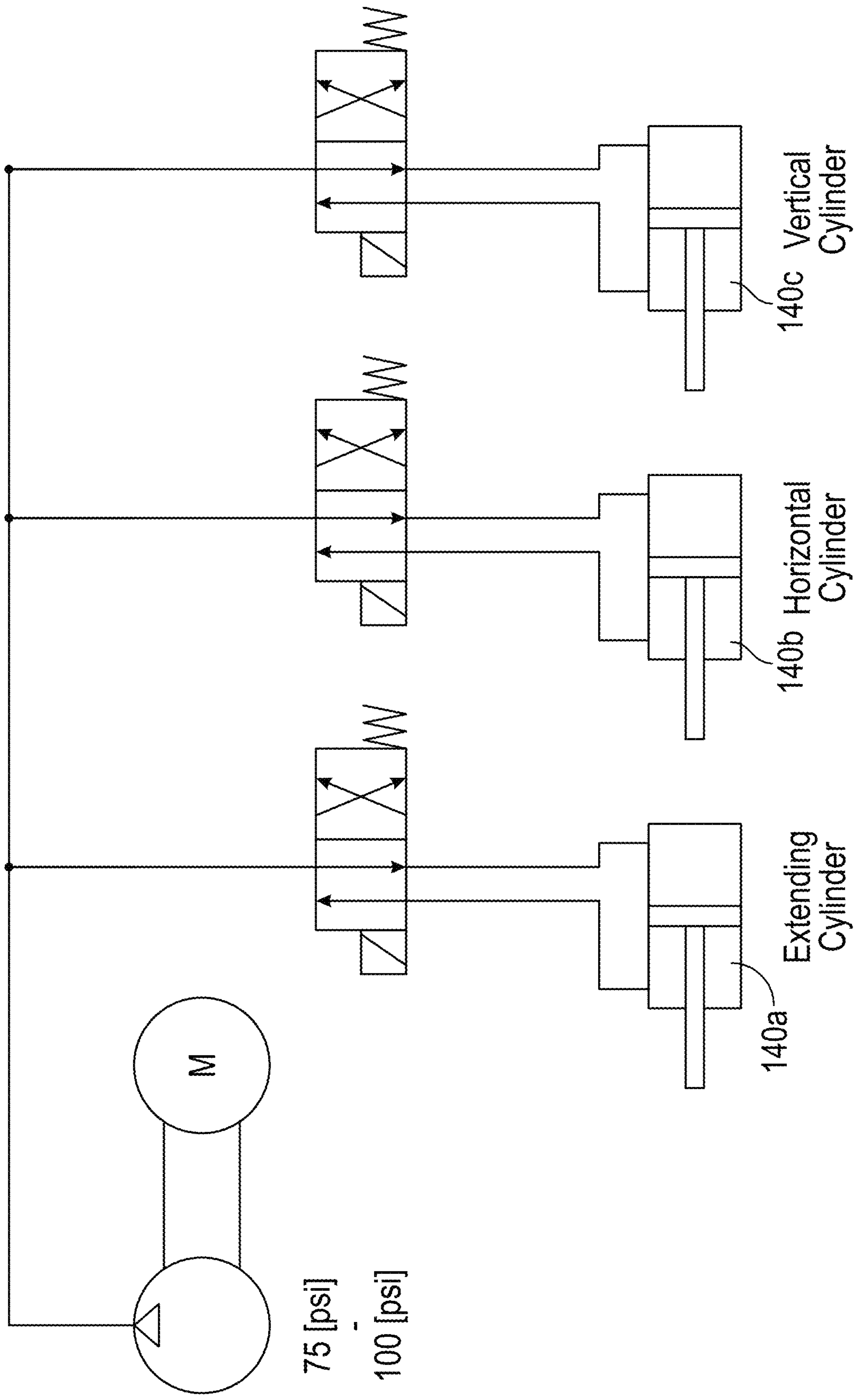
FIG. 7 is a schematic illustration of the pneumatic system of the apparatus of FIG. 1 in accordance with an illustrative embodiment of the presently disclosed subject matter.

A schematic of the pneumatic system can be seen in FIG. 7. In certain illustrative embodiments, pneumatic actuation can include three extending and retracting pneumatic cylinders 140, including extending cylinder 140*a*, horizontal cylinder 140*b* and vertical cylinder 140*c*, that are used to actuate motion, each controlled by, for example, a 4-way, 2-position, spring return solenoid. Each of these solenoids is mounted to a manifold that would be connected to an air supply and exhaust for the system. By engaging and disengaging the solenoid, the cylinders 140 can be made to extend and retract when necessary.

Figure 8:
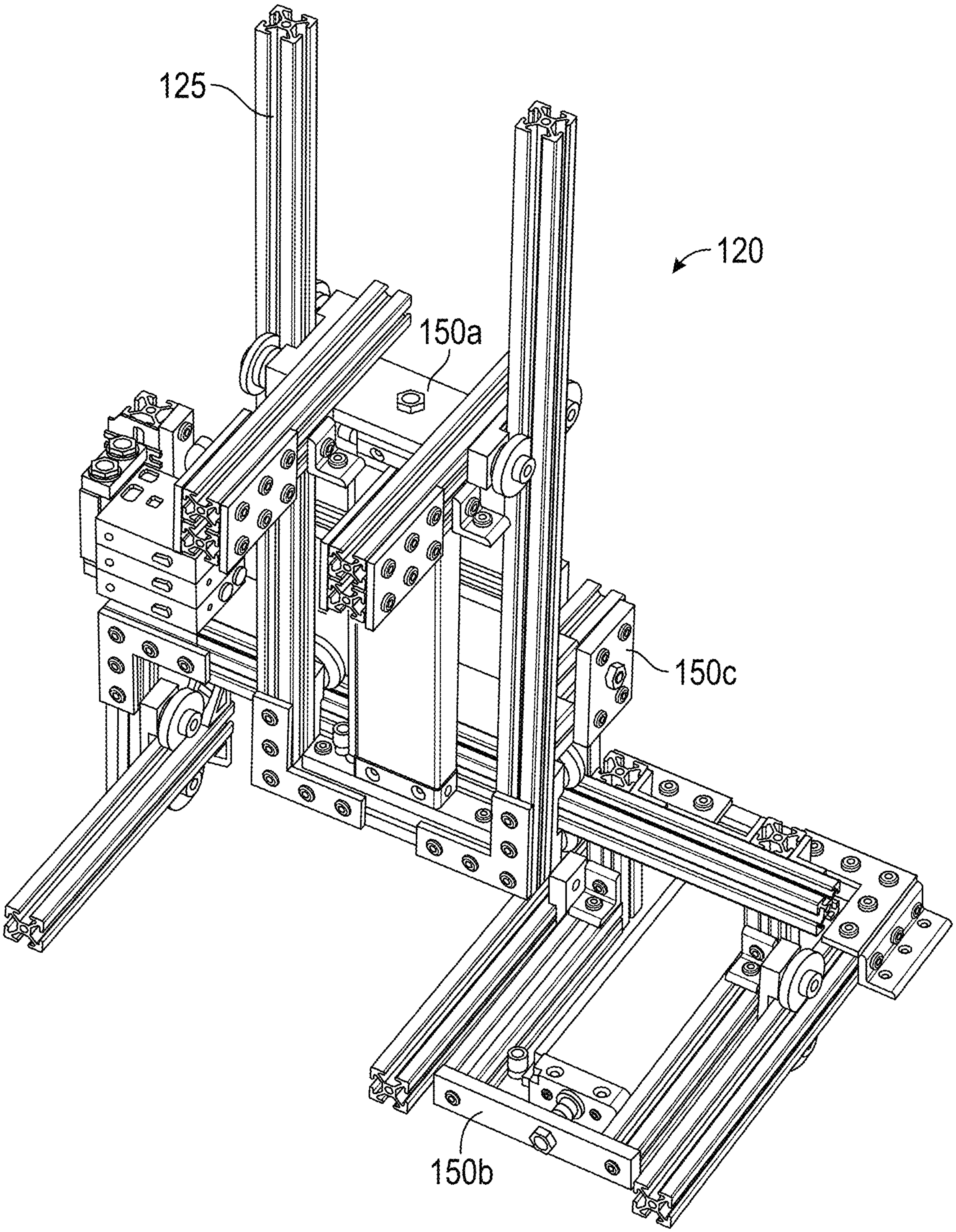
FIG. 8 is an illustration of the frame of the movement assembly of the apparatus of FIG. 1 in accordance with an illustrative embodiment of the presently disclosed subject matter.

An illustrative embodiment of the frame 125 of the movement assembly 120 can be seen in FIG. 8. In certain illustrative embodiments, the frame 125 of the movement assembly 120 can be designed using standard 8020 1010 t-slotted beam. The 1010 framing can be 1 inch×1 inch aluminum beam extrusions, with slots cut into the profile to allow for flexible fastener mounting and connections. The 1010 framing fits well with the flat pneumatic cylinders 140. The mount plates for the d pneumatic cylinders 140 can have counterbored holes that are sized for the 8020 bolts and t-nuts used to mount to the 1010 beams. The flat cylinder profile can be, for example 0.9 inches thick, so that it fits well within the 1 inch thickness of the beams. The 8020 framing can also have existing roller assemblies that fit into the grooves within the beam, which can facilitate the linear motion of the movement assembly 120. Other framing means may also be utilized without departing from the spirit or scope of the presently disclosed subject matter.

In certain illustrative embodiments, custom machined connecting plates 150 can cut out of ⅜ inch thick aluminum to connect the threaded cylinder rods to the moving frame pieces. The location of these custom plates 150 can be seen in FIG. 8, where three custom connecting plates 150*a*, 150*b*, and 150*c* are shown.

In certain illustrative embodiments, three pneumatic cylinders 140, including extending cylinder 140*a*, horizontal cylinder 140*b* and vertical cylinder 140*c* (directional names used for reference purposes only), can be used to actuate the movement assembly 120. These cylinders 140 result in three different linear motions to move the frame 125 and the sticker head assembly 90. The three cylinders 140 and their location with respect to movement assembly 120 can be seen in FIG. 9.

Figure 9:
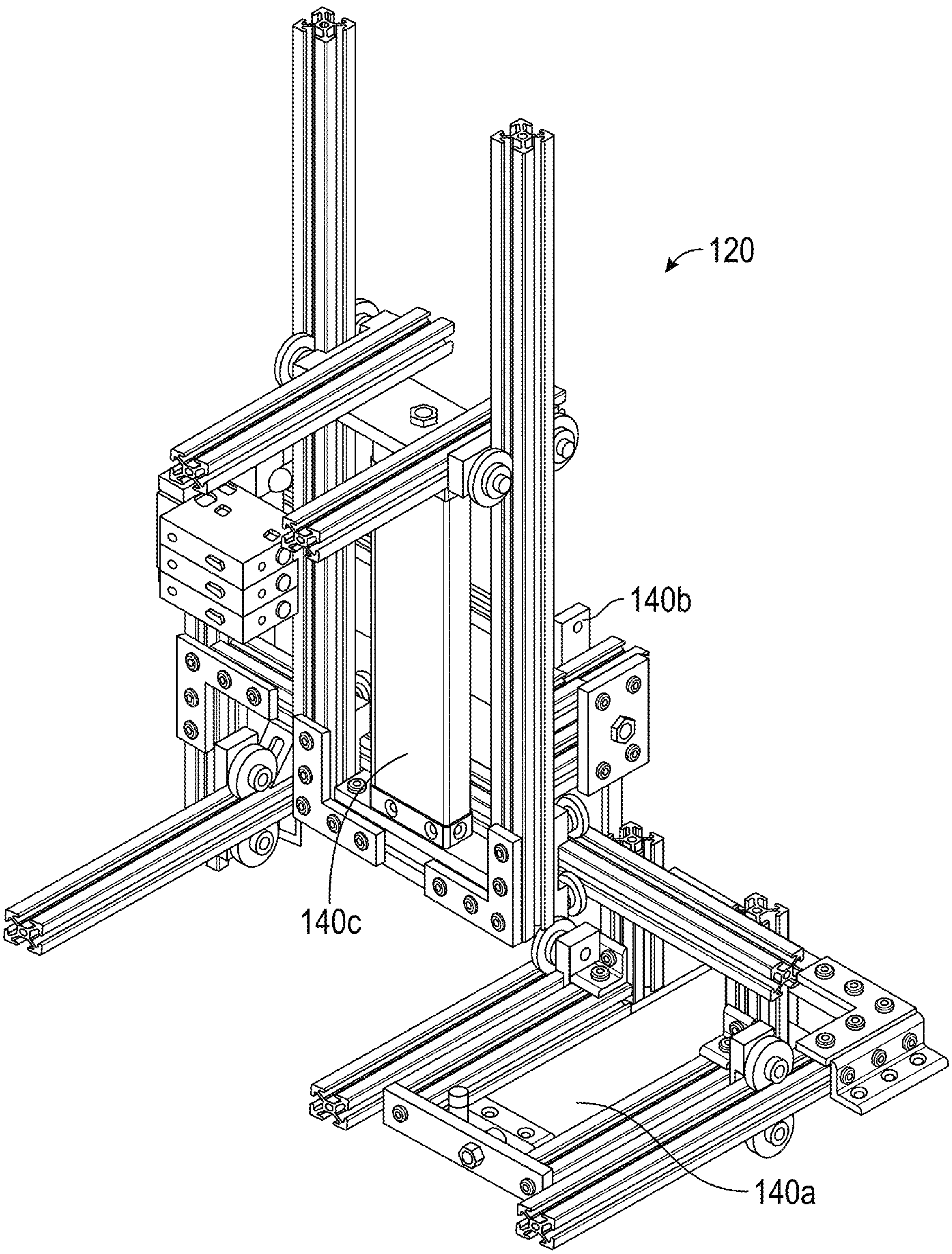
FIG. 9 is an illustration of the pneumatic cylinders of the movement assembly of the apparatus of FIG. 1 in accordance with an illustrative embodiment of the presently disclosed subject matter.

In operation, first the movement assembly 120 would sit as seen in FIG. 9. In this position, the movement assembly 120 is fully retracted and does not hinder any of the required arm operations on waste vehicle 5. As used herein, the term arm operations means engaged in all necessary activities required for successfully applying a sticker to a cart including beginning and completion activities. This position is specifically designed to allow the waste container 40 to be lifted up and into the top of the truck 5 without getting caught on the sides of the truck hopper.

Figure 10:
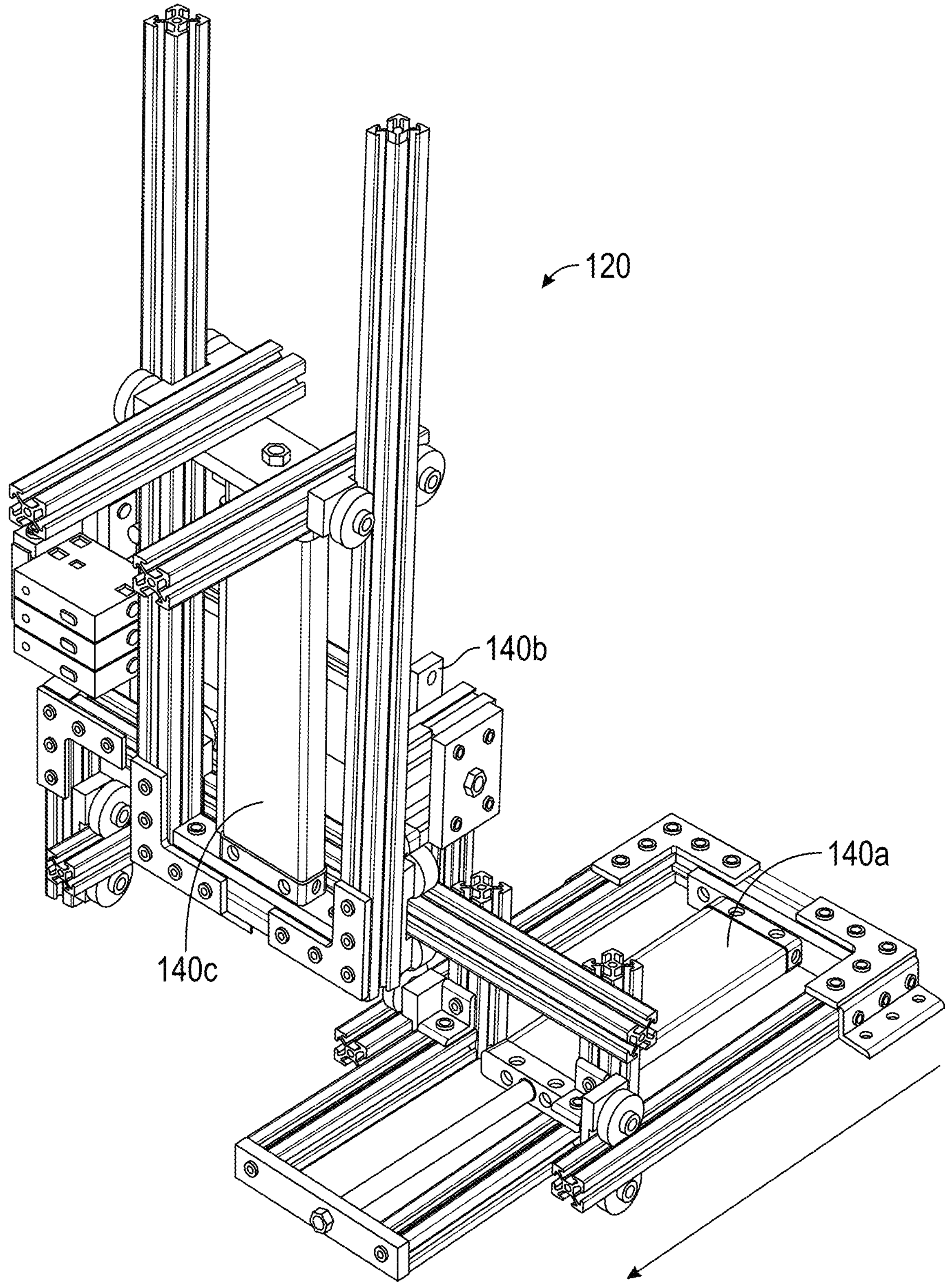
FIG. 10 is an illustration of the movement assembly with the horizontal positioner in its extended position in accordance with an illustrative embodiment of the presently disclosed subject matter.

In FIG. 10, the movement assembly 120 is in its extended position, with the extending cylinder 140*a* extended. This motion allows the sticker head assembly 90 to reach the side of the recycling cart 40. Extending cylinder 140*a* would remain extended until the waste container 40 needs to be dumped into the truck 5, for example into a hopper, at which point it would retract. Otherwise, it is able to stay extended during the route.

Figure 11:
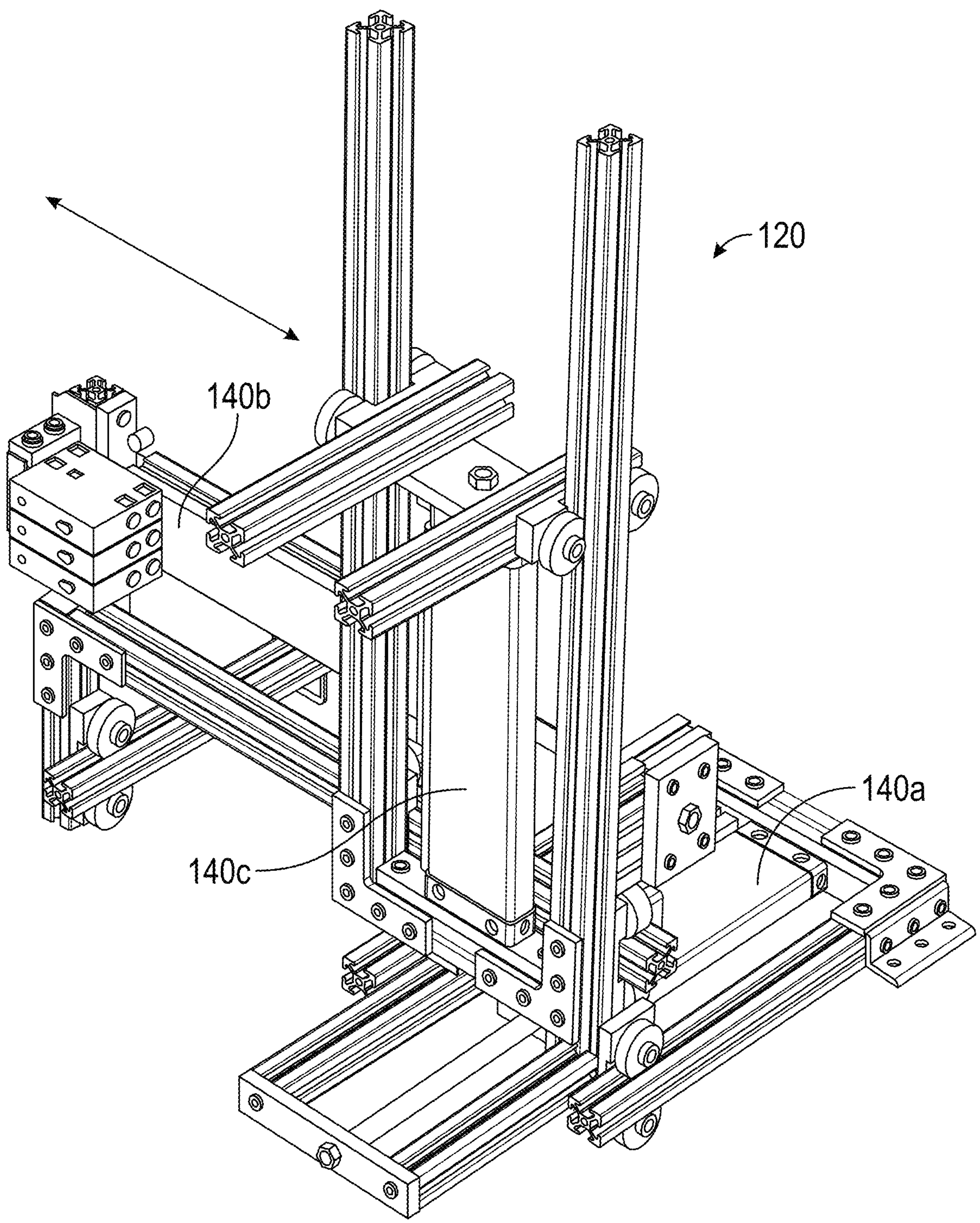
FIG. 11 is an illustration of the movement assembly with the horizontal positioner in its extended position in accordance with an illustrative embodiment of the presently disclosed subject matter.

Following the extension, the sticker head assembly 90 is in place to press a sticker 20 to the side of the recycling cart 40. This is done with the horizontal cylinder 140*b* which is shown extended in FIG. 11. This motion brings the sticker 20 into its initial contact with the side of the recycling cart 40.

Figure 12:
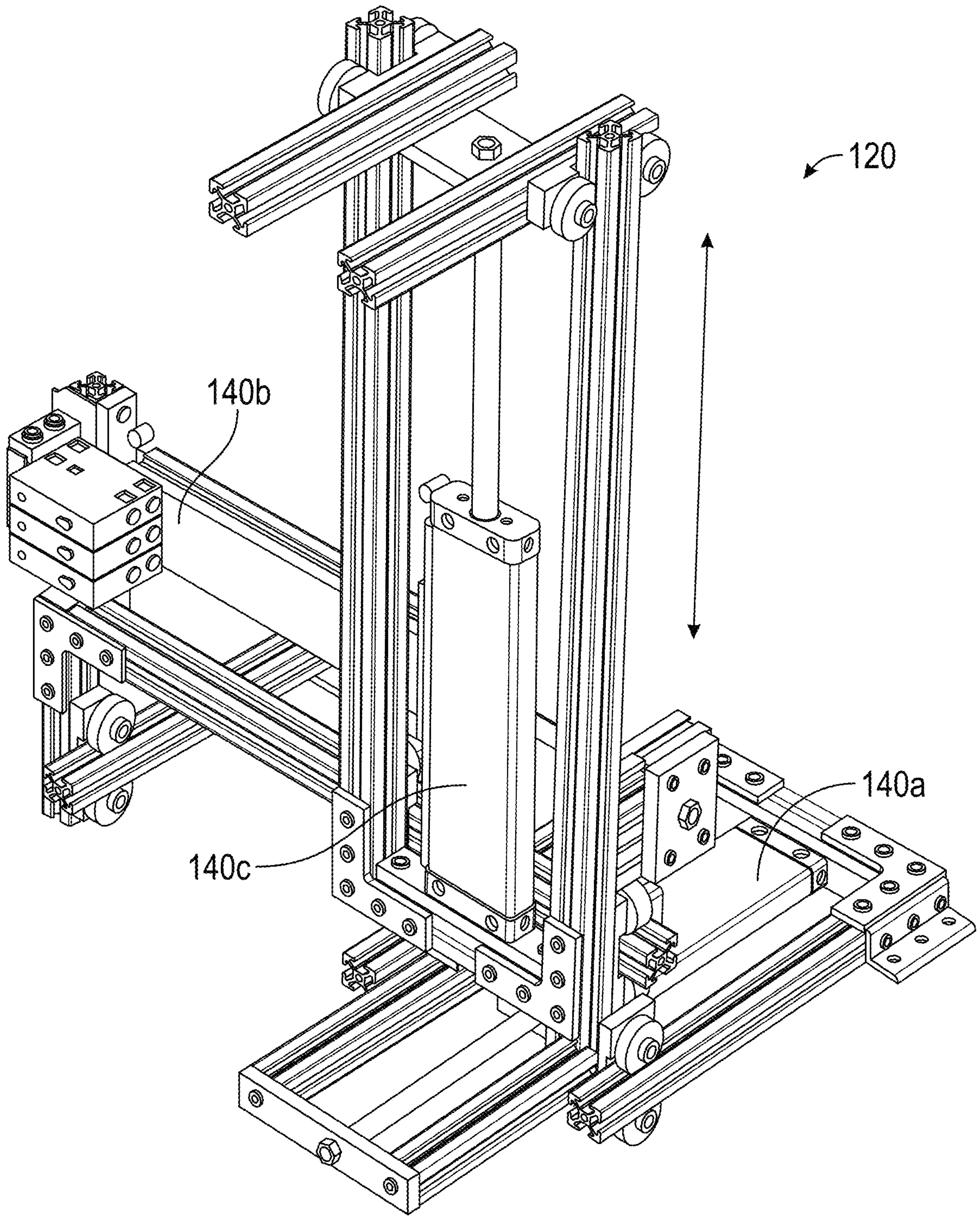
FIG. 12 is an illustration of the movement assembly with the vertical positioner in its extended position in accordance with an illustrative embodiment of the presently disclosed subject matter.

Finally, once the sticker 20 is initially pressed onto the side of the cart 40, the vertical cylinder 140*c* would extend upward to slide the sticker 20 up the side, and onto the top of, the recycling cart 40. The end position of this motion can be seen in FIG. 12, which displays the movement assembly 120 with all three cylinders 140 at full extension. Following this motion, the vertical cylinder 140*c* would retract back down over the sticker 20, and the horizontal cylinder 140*b* would then retract back to ready the apparatus for another sticker application.

Figure 13:
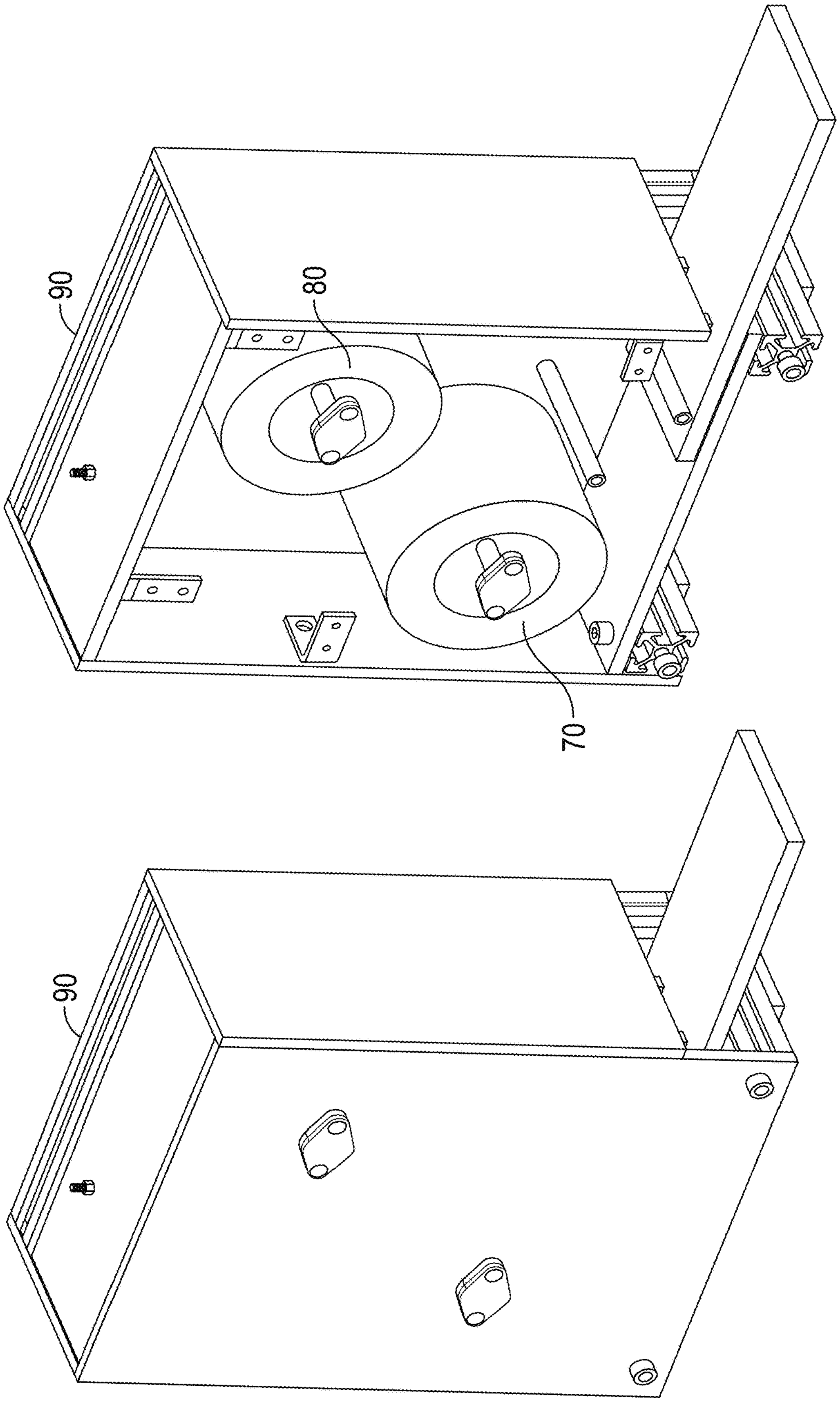
FIG. 13 is an illustration of a sticker head assembly in accordance with an illustrative embodiment of the presently disclosed subject matter.
Figure 14:
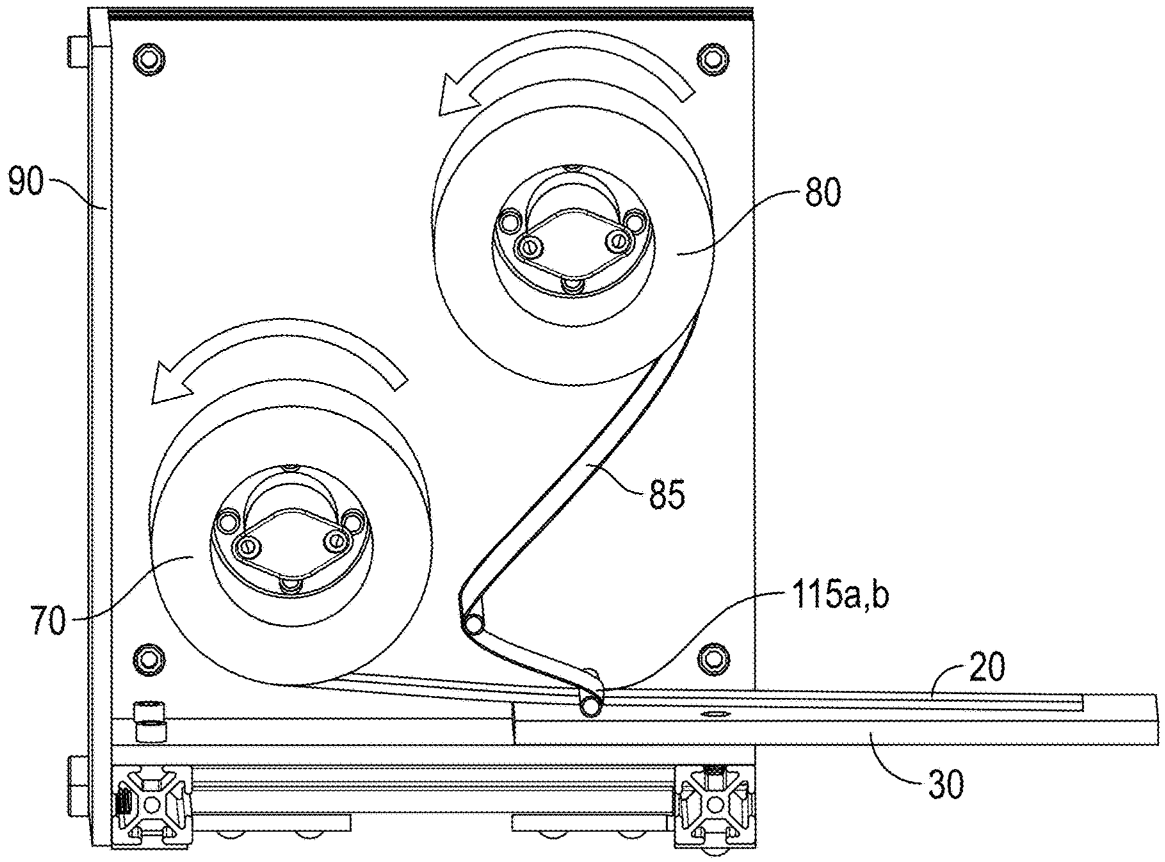
FIG. 14 is an illustration of the internal components of a sticker head assembly in accordance with an illustrative embodiment of the presently disclosed subject matter.

Sticker Head Assembly: In certain illustrative embodiments, the sticker labeling dispenser, a.k.a. the sticker head assembly 90, is responsible for the unrolling, separating, peeling and application of stickers 20. The assembly 90 can be seen in FIG. 13, with and without the front plate. The sticker head assembly 90 functions by feeding a sticker 20 through a series of joints that separate the sticker 20 from its backing 85. When the sticker backing 85 is pulled at high tension over a sharp angle, the sticker 20 will separate from the backing 85. The sticker head assembly 90 utilizes this concept. FIG. 14 further illustrates this process. The arrows represent the rotational direction of the sticker roll 70 (lower left), and sticker backing collection roll 80 (upper right). When initially unrolled from sticker roll 70, the sticker 20 is still attached to its backing 85. The sharp angle provided by a standoff such as at separator roll 115 separates the sticker 20 from the backing 85 and sticker 20 is fed onto the tongue 30 of the sticker head assembly 90. The removed sticker backing 85 is fed at high tension to a backing collection roll 80.

In certain illustrative embodiments, the sticker head assembly 90 is constructed from 8020 framing and ¼" thick aluminum plates. The back of the sticker head assembly 90 is supported by four 8" 8020 beams outlining the profile of the sticker head assembly 90. These beams not only provide support, but also allow for easy mounting to the movement assembly 120. Two 3.25" 8020 beams provide structural support on the bottom of the sticker head assembly 90 as well. The entire assembly 90 can be enclosed in six sheets of ¼" thick 6061 aluminum. These plates allow for easy mounting of the components of assembly 90 and also aid in weatherproofing some of the components. Each of these plates can be machined from a 3' by 1' plate of aluminum to meet specific size specifications. Holes can also be drilled into the plates in order to mount components. Other means may also be utilized without departing from the spirit or scope of the presently disclosed subject matter.

Figure 15:
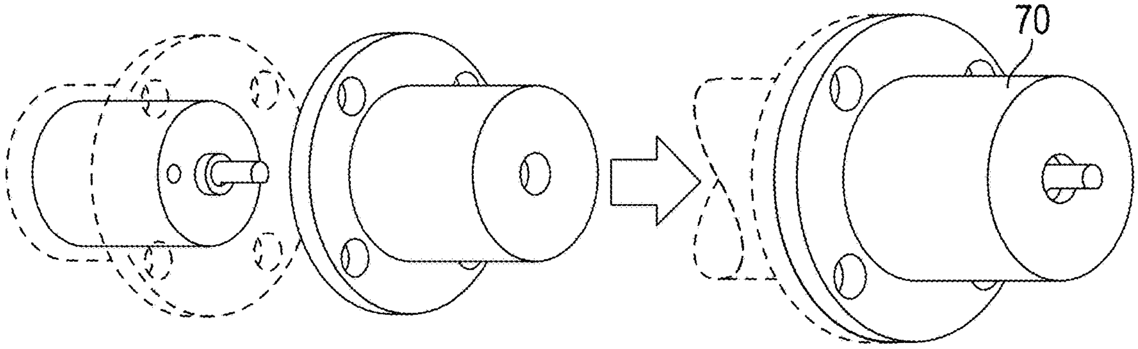
FIG. 15 is an illustration of a motor and motor mount assembly for a sticker head assembly in accordance with an illustrative embodiment of the presently disclosed subject matter.
Figure 16:
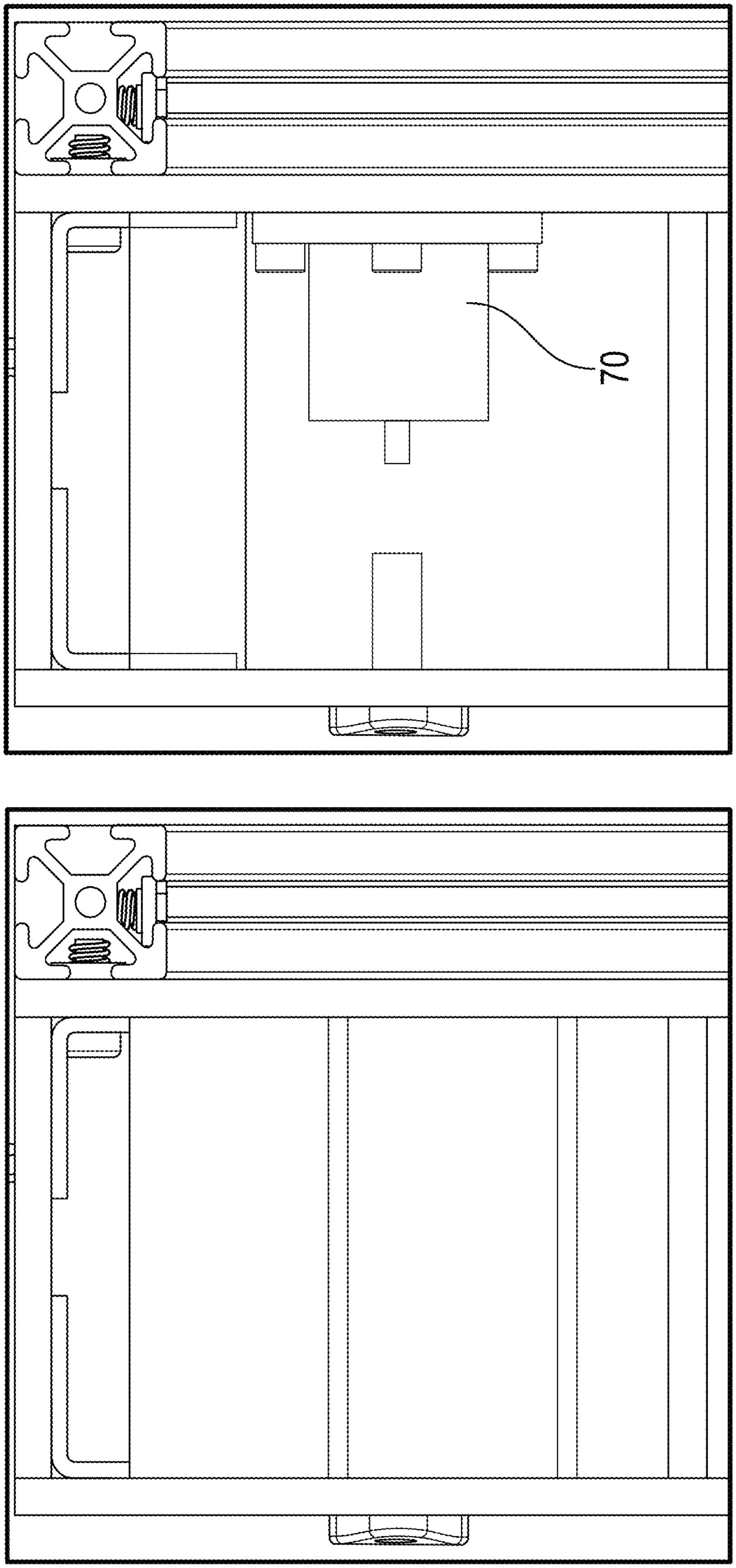
FIG. 16 is an illustration of a sticker head assembly in accordance with an illustrative embodiment of the presently disclosed subject matter.

In certain illustrative embodiments, two FIT0441 12 volt brushless DC motors can drive the rotation of the sticker roll 70 and backing collection roll 80. These motors can be attached to the backplate of the sticker head assembly 90 via a 3D printed motor mount. The motor and motor mount assembly can be seen in FIG. 15. The motor mount will slide over the motor, allowing the rotating shaft to protrude outside of the mount. The motor shaft can be attached to a custom 3D printed sticker mount. The sticker mount will take the shape of the sticker roll 70 inner diameter. The motor shaft will rotate the sticker mount in order to drive the rotation of the sticker roll 70. For support, the sticker mount will also be attached to a shaft within a ball bearing. This ball bearing will be mounted on the front plate of the sticker head. These components can be seen in FIG. 16. The image on the left shows a side view of the sticker roll 70. The image on the right shows the components inside the sticker roll 70. The sticker mount will fit inside the hollowed area of the sticker roll 70 and attach to the two shafts.

In certain illustrative embodiments, the stickers 20 can separate from their backing 30 when the backing 30 is pulled at sufficient tension over a sharp angle. As shown in FIG. 14, the sticker head apparatus 90 can use two standoffs such as separator rolls 115 to reroute the sticker backing 30. The two standoffs 115 provide tension when the backing 30 is fed through them. The sticker 20 will separate from the backing 30 after it is pulled past the first standoff 115*a*. At this point, the sticker 20 will slide along the tongue 30 of the sticker head assembly 90. The tongue 30 can be cut from a polyurethane rubber sheet. In certain illustrative embodiments, an IR sensor can be located within a cut out of the tongue 30 to detect when a sticker 20 has been successfully separated from the backing 30 and applied to the cart 40. The stickers 20 can contain a black bar at the bottom of the sticker graphic for the IR sensor to read. Once read, the system will know that the sticker 20 has been completely peeled off, and the sticker roll 70 will then cease rotating.

Two 12V brushless DC gear motors can rotate the sticker roll mounting subassemblies 70, 80. The rotation of these subassemblies 70, 80 drives the sticker 20 over two standoffs 115*a*, 115*b*. The second standoff 115*a* separates the sticker 20 from the backing 85. The backing 85 is collected on a sticker backing collector assembly 80 and the sticker 20 is fed onto the sticker head tongue 30 which applies the sticker 20 to the cart 40.

Figure 17:
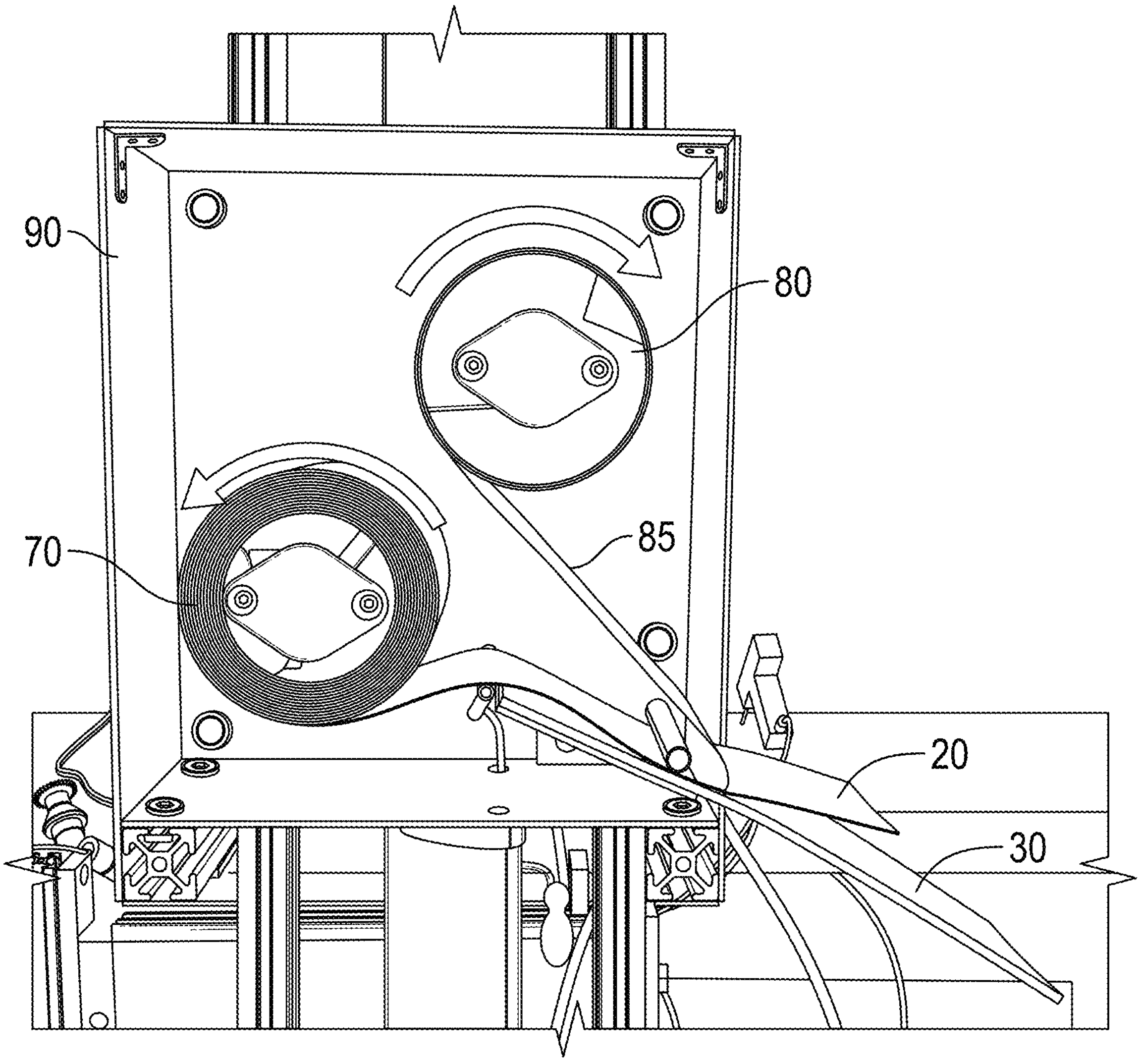
FIG. 17 is an illustration of a sticker head assembly in accordance with an illustrative embodiment of the presently disclosed subject matter.

A labeled diagram of the overall sticker head assembly 90 can be seen in FIG. 17.

Figure 18:
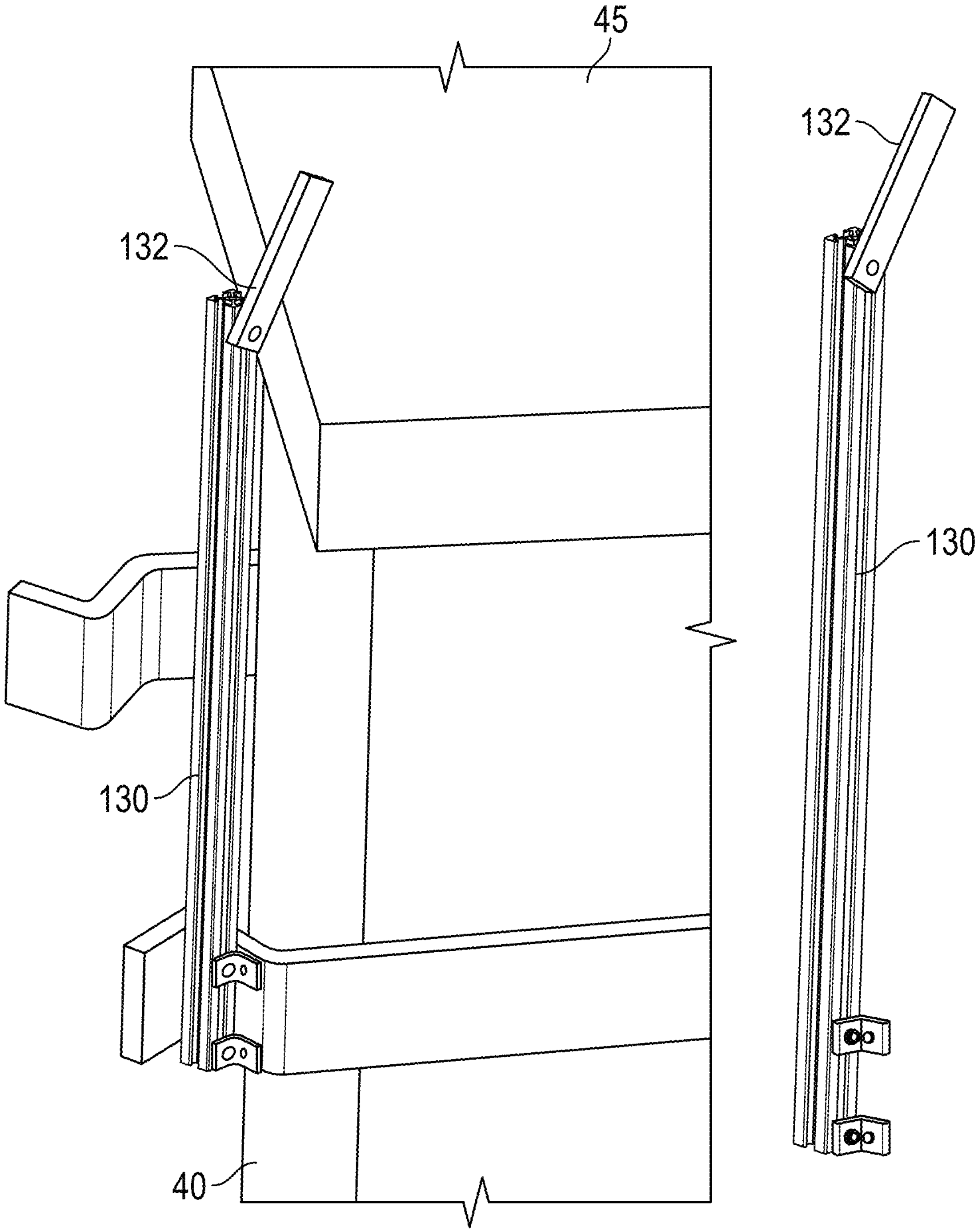
FIG. 18 is an illustration of a lid stick assembly in accordance with an illustrative embodiment of the presently disclosed subject matter.
Figure 19:
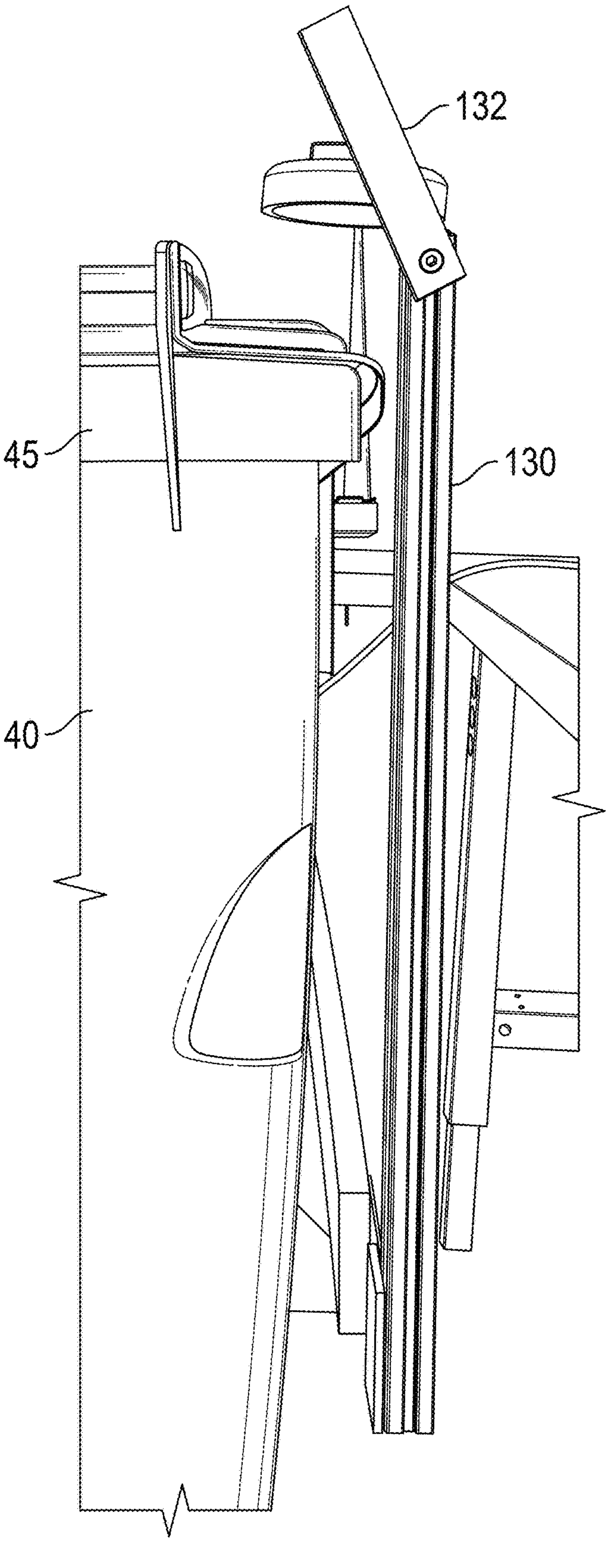
FIG. 19 is an illustration of a lid stick assembly in accordance with an illustrative embodiment of the presently disclosed subject matter.

Lid Stick. In certain illustrative embodiments, the lid containment arm, a.k.a. the lid stick assembly 130, can prevent the lid of the recycling cart 40 from swinging fully open when being dumped. The lid is prevented from swinging beyond 90° backwards so that gravity will pull it back down to close the lid without the need for any additional actuation. An illustrative embodiment of the lid stick assembly can be seen in FIGS. 18 and 19. In certain illustrative embodiments, at the top of the stick assembly 130 is a custom plate 132 that is angled to contact the lid before it swings beyond 90° backwards. Plate 132 could be a rigid material, or a more flexible or soft material. The lid stick assembly 130 can keep the lid of the recycling cart 40 closed after being dumped. When the cart 40 is dumped, the lid stick assembly 130 can prevent the lid of the recycling cart 40 from opening beyond 90°, which would cause the weight of the lid to pull the lid closed due to gravity.

Thus, in certain illustrative embodiments, the apparatus 10 for applying a sticker label to a waste container 40 during waste collection or recycling operations can include an xyz-positioner 120 and a sticker labeling dispenser 90, wherein the xyz-positioner 120 is disposed on a waste collection or recycling vehicle 5 and the sticker labeling dispenser 90 is disposed on the xyz-positioner 120, and wherein the xyz-positioner 120 is configured to move the sticker labeling dispenser 90 along x, y, and z coordinates and into proximity with the waste container 40 during operations of the waste collection or recycling vehicle 5, such that the sticker label 20 can be applied to the waste container 5. The apparatus 10 can further include a lid containment arm 130 disposed on the xyz-positioner 120 and configured to contact the lid of the waste container 40 and keep the lid in a closed position, such that the sticker label 20 can be applied to both the lid and the side wall of the waste container 40. It is to be understood that the present invention is not limited to the embodiment described above.

Electrical System: In certain illustrative embodiments, there will be four main aspects of the electrical system for apparatus 10: a microcontroller board (such as the Arduino UNO), relays, solenoids and motors. The Arduino can have 9 V wall power supply as an input. The Arduino then outputs to four pins, inputting into each relay. Each of these relays will have 2 inputs, one from the Arduino and then one from a 12V power supply. Then, each relay is either connected to a solenoid or a motor. The solenoids are connected to the actuators that move the xyz positioner 120 towards or away from the cart 40 and then down for the sticker 20 to be applied. The motors are connected to the sticker applicator belt 70 that moves the sticker 20 from the roll 70 to the cart 40. Lastly, an IR sensor will be connected to the Arduino and motor. This IR sensor will allow for the motors to be stopped after each singular sticker 20 when a thin black line across the bottom of the sticker 20 is sensed.

Figure 20:
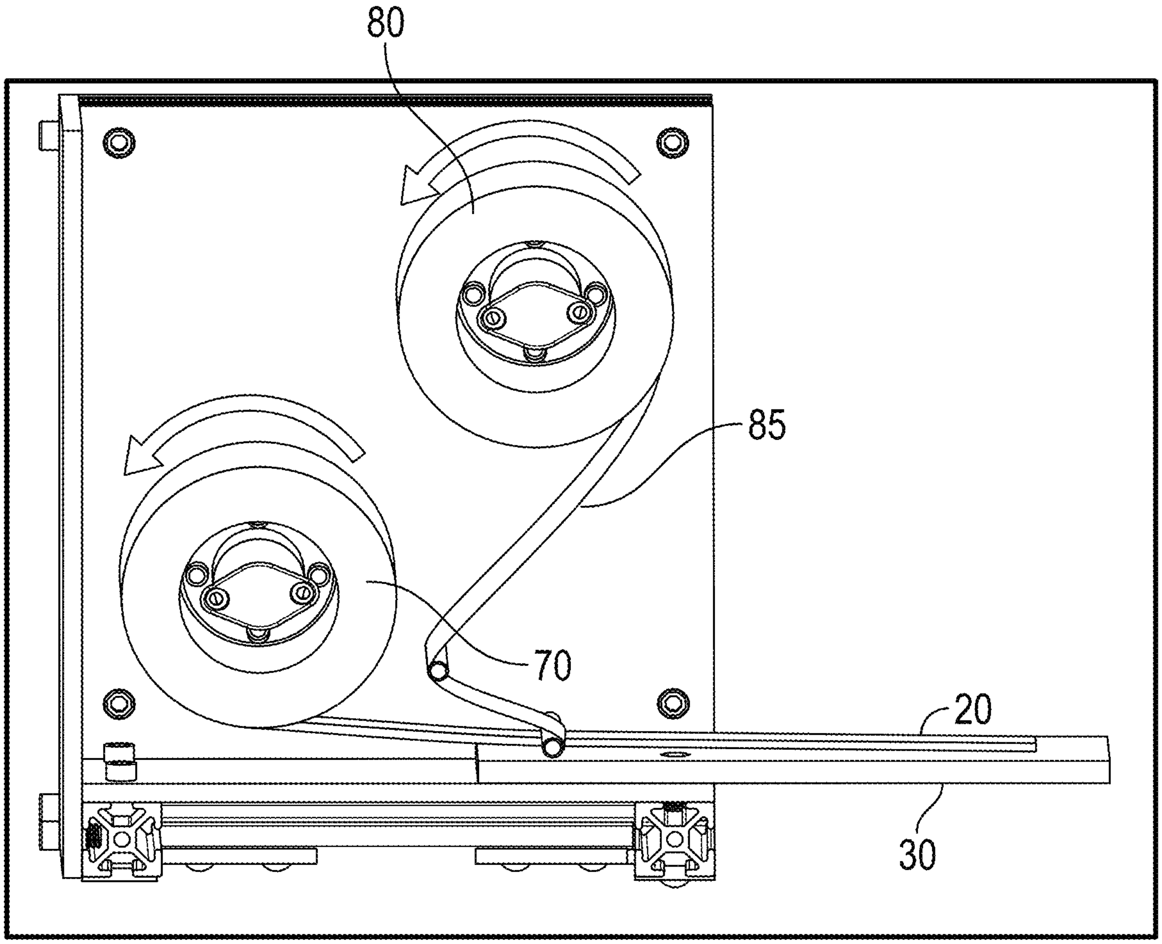
FIG. 20 is an illustration of a pair of sticker motors for a sticker head assembly in accordance with an illustrative embodiment of the presently disclosed subject matter.
Figure 21:
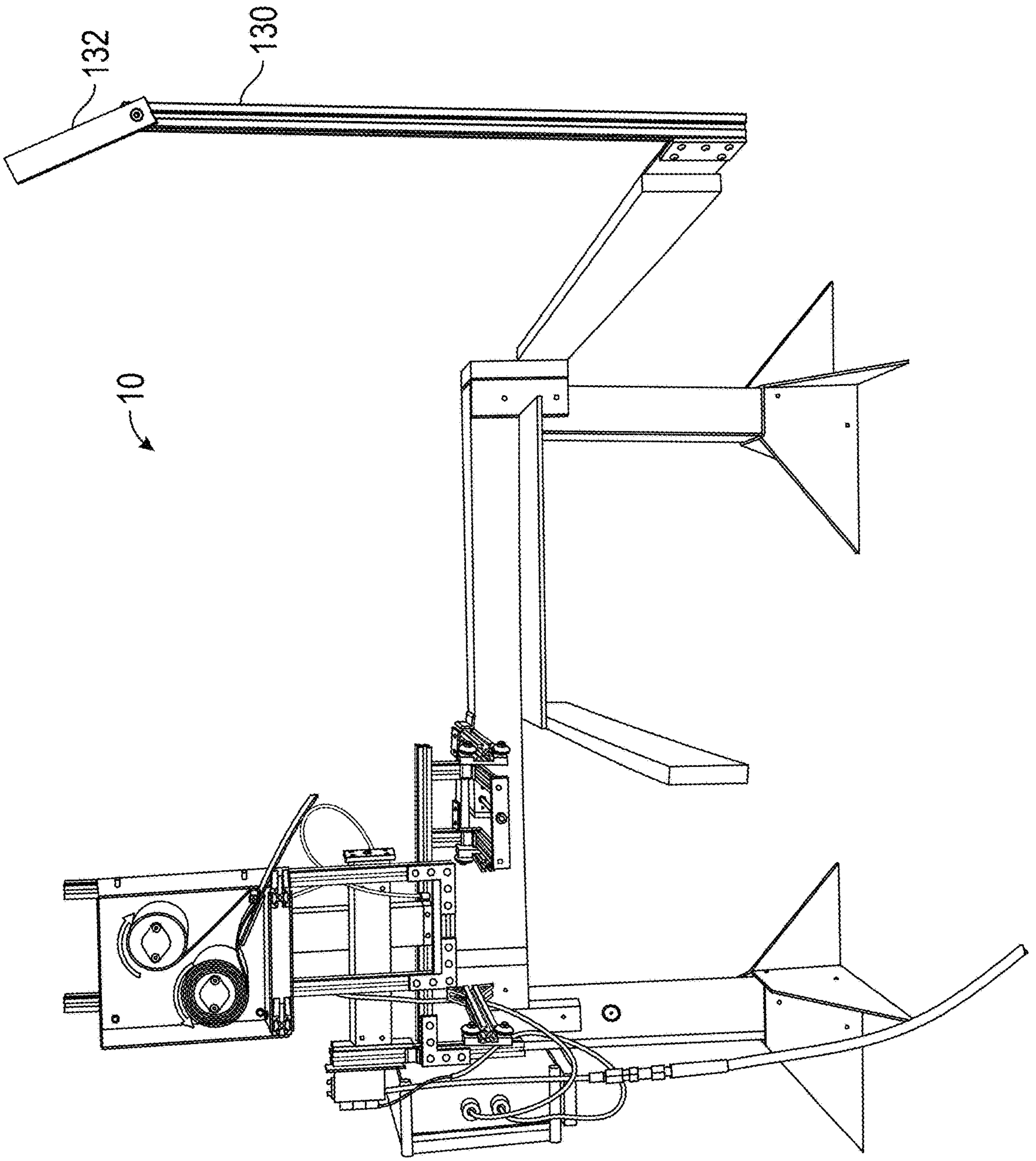
FIG. 21 is an illustration of an apparatus for applying labels to carts such as contaminated recycling carts in accordance with an illustrative embodiment of the presently disclosed subject matter.
Figure 22:
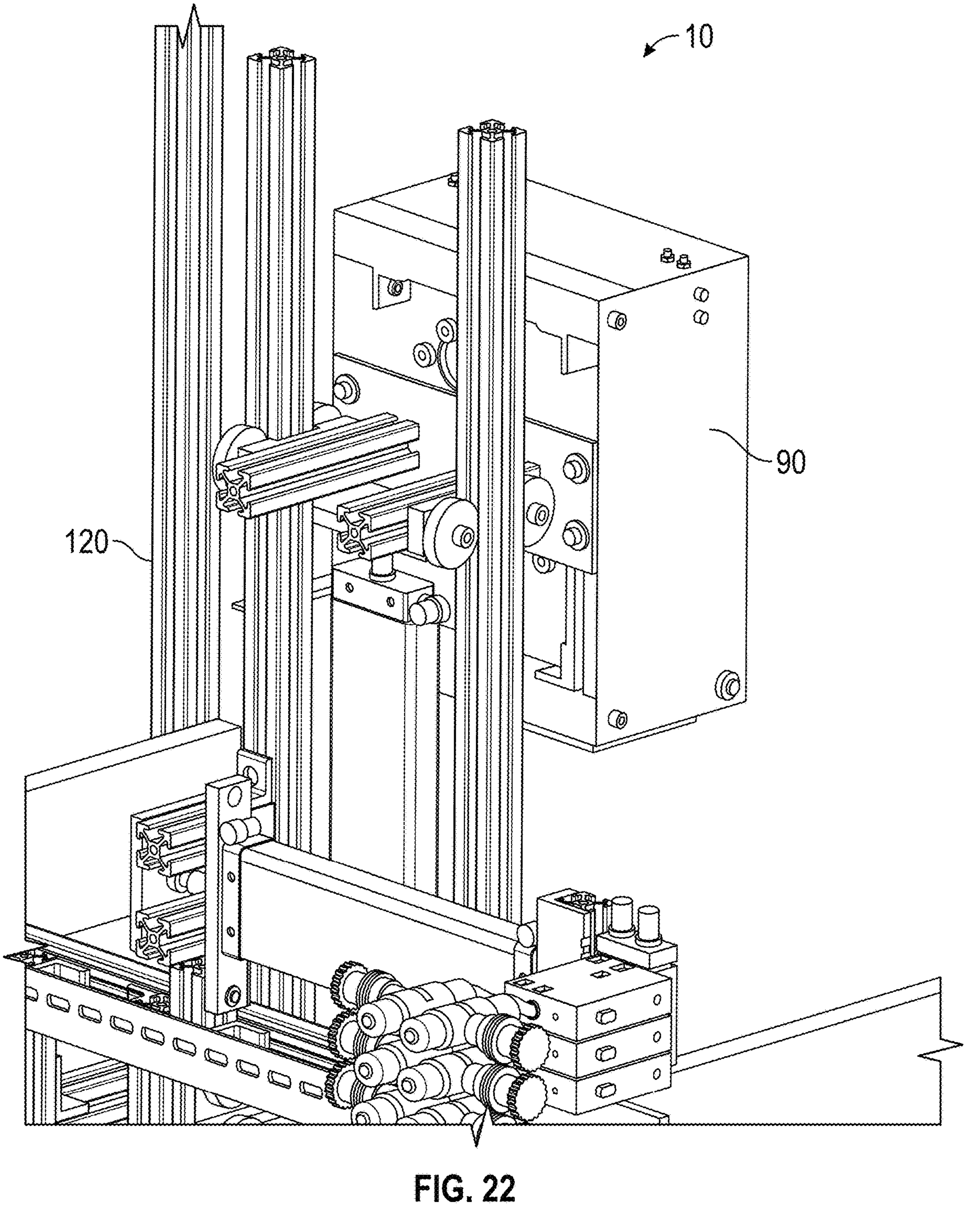
FIG. 22 is an illustration of a a sticker head assembly in accordance with an illustrative embodiment of the presently disclosed subject matter.

In order to program the Arduino Uno, the Arduino IDE application, which primarily uses C programming language, can be downloaded and used. To start, if the button that is to start the system is pressed and there are no stickers 20 available then a red LED will turn on and the system will not move. This will be done using a break beam sensor which will detect motion of the sticker rolls 70, 80. If there is not motion then it will deem that there are no stickers 20 left. If there are stickers 20 present and motion is present the code passes the first if statement and will go through the system further. First, it will push the horizontal pneumatic cylinder 140*b* out, then the vertical pneumatic cylinder 140*c*. At the same time the motors will move together. The motor at roll 80, as seen in FIG. 20, will collect the sticker backing 85 and the motor at roll 70 which will then feed the stickers 20 out onto the cart. Using an IR sensor and a black line on the end of sticker 20 will control when the motors will stop. Finally, after the sticker 20 is applied, the motors will stop, and both pneumatic cylinders 140*b*, 140*c* will retract back to their original position An illustrative embodiment of the apparatus 10 is shown in FIG. 21. The movement assembly 120, lid stick 130, and electrical box are all mounted to a model wooden arm frame. In actual use, apparatus 10 would be connected to a waste vehicle 5. The sticker head is mounted to the movement assembly 120 by an aluminum plate which can be seen in FIG. 22.

Figure 23:
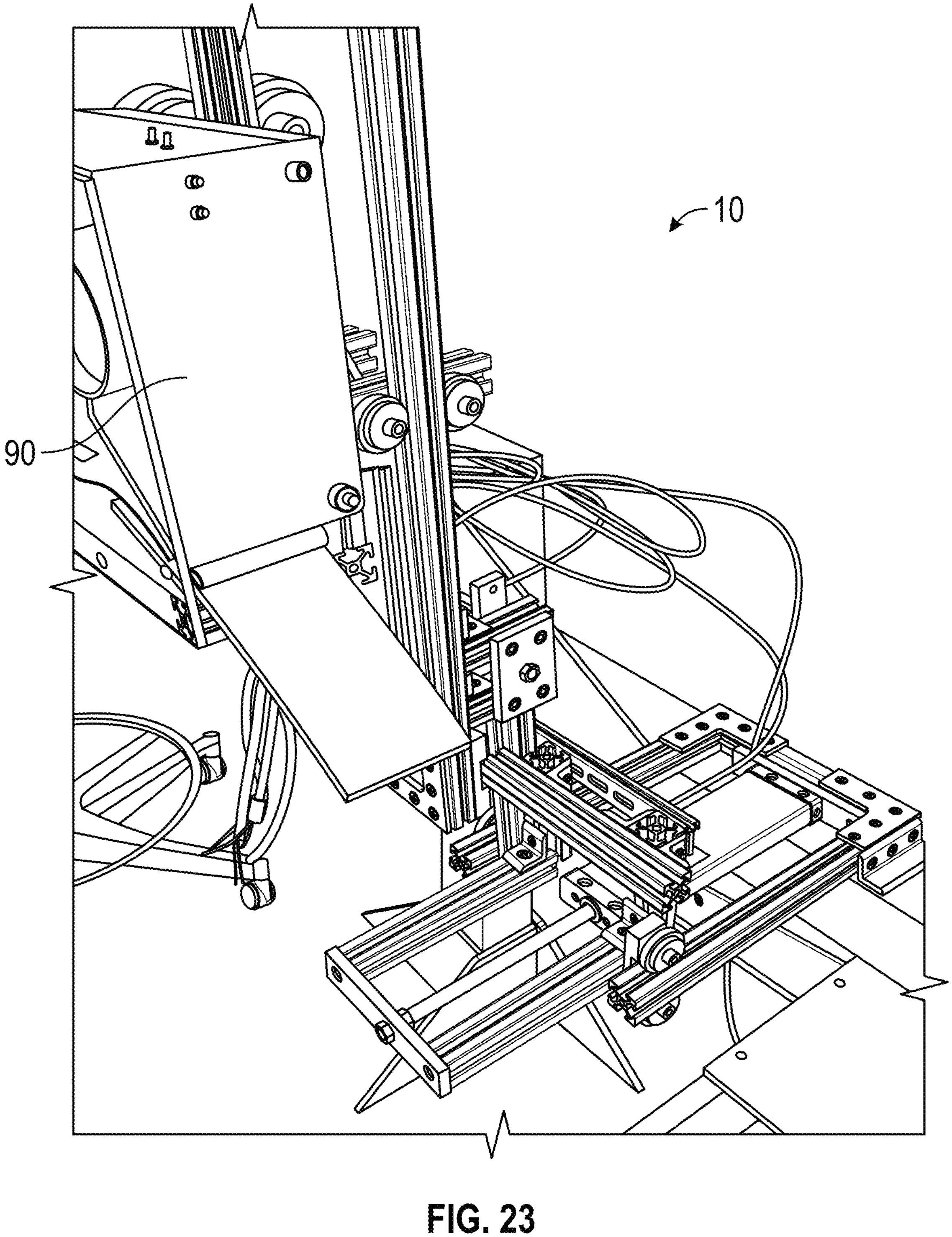
FIG. 23 is an illustration of a movement assembly in accordance with an illustrative embodiment of the presently disclosed subject matter.
Figure 24:
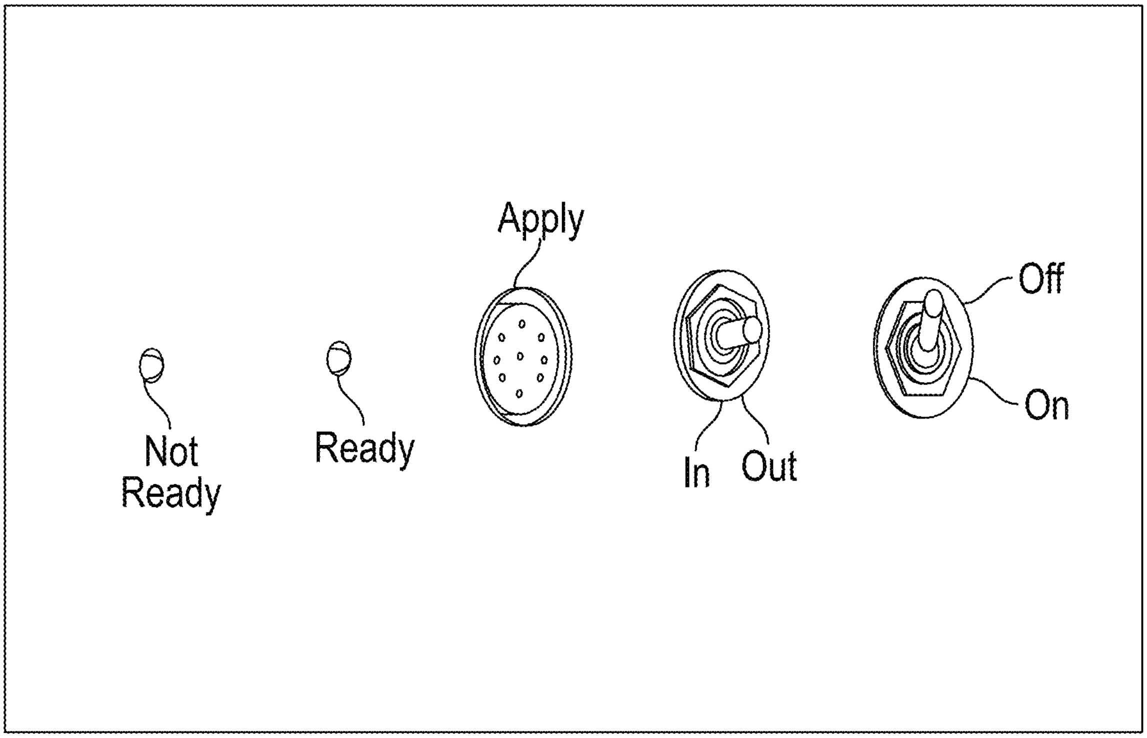
FIG. 24 is an illustration of a control board for a movement assembly in accordance with an illustrative embodiment of the presently disclosed subject matter.

Method of Operation: In certain illustrative embodiments, the method of operation of the apparatus 10 is as follows. First the apparatus 10 pushes out and away from the truck arm by the actuating cylinder as seen in FIG. 23, which displays extension of cylinder to position mechanism for sticker application. This would be done by the operator flipping the "In/Out" switch to the "Out" position as seen in FIG. 24, below. This extension positions the sticker head next to the recycling cart 40 so that it is ready for sticker application. This is the point where a truck operator would grab a recycling cart 40 and dump it into the waste container. As the recycling cart 40 was swung back down, the lid stick 130 would prevent the lid 132 from opening beyond 90°, and thus the weight of the lid 132 would pull the lid 132 back closed.

With the recycling cart 130 empty and closed, it would be ready for sticker application. The operator would note that the "Ready" light in FIG. 24 would be illuminated indicating that the mechanism could apply a sticker, and then could press the "Apply" button in FIG. 24. This would cause the sticker head to dispense a sticker 20 by spinning the dispensing motors, followed by the extension of cylinder as seen in in FIG. 25, which shows the initial application of the sticker 20 to side of recycling cart 40. This presses the tongue 30 of the sticker 20 head against the side of the recycling cart 40 to initially adhere the sticker 20.

Figure 26:
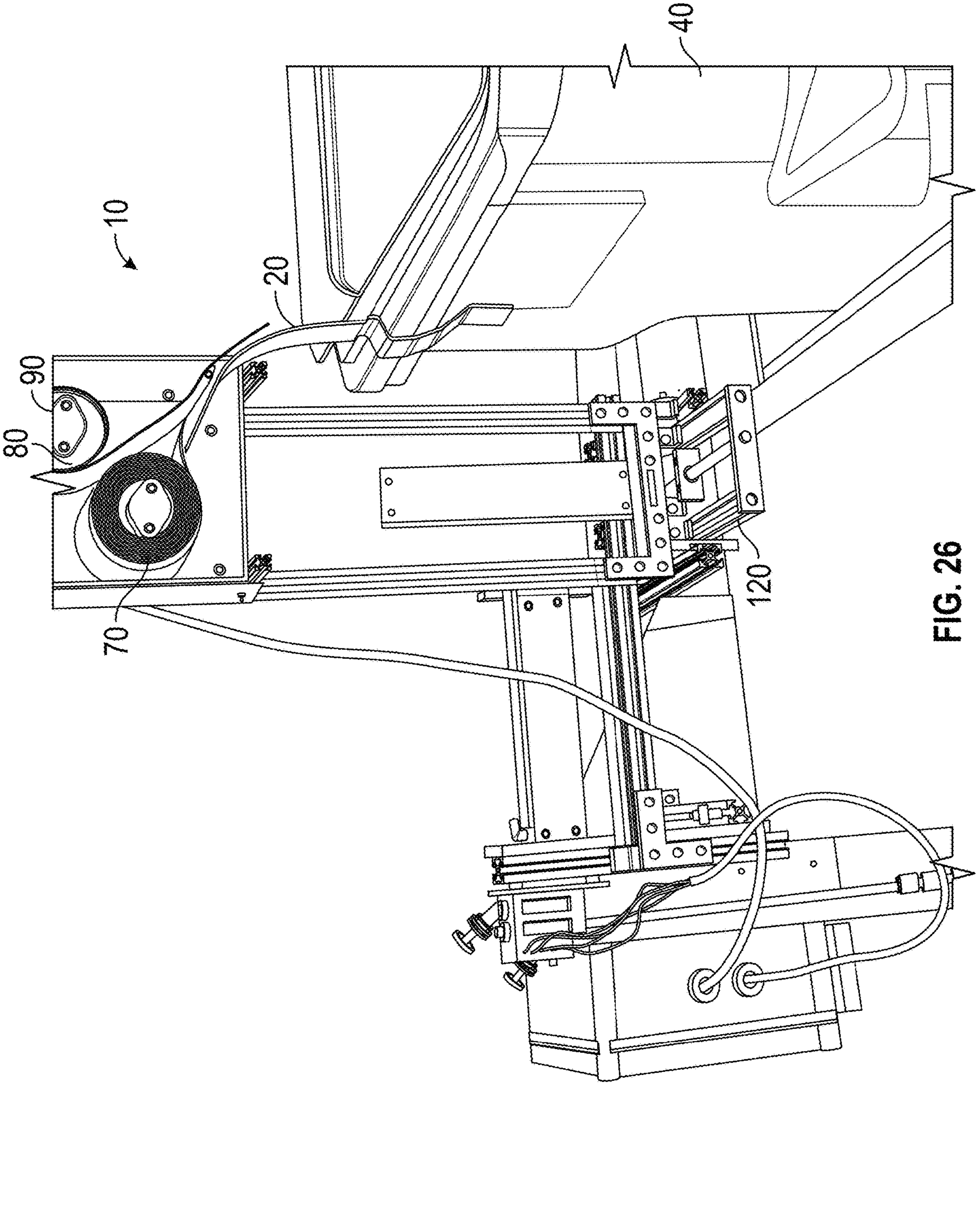
FIG. 26 is an illustration of an apparatus for applying labels to carts such as contaminated recycling carts in accordance with an illustrative embodiment of the presently disclosed subject matter.
Figure 27:
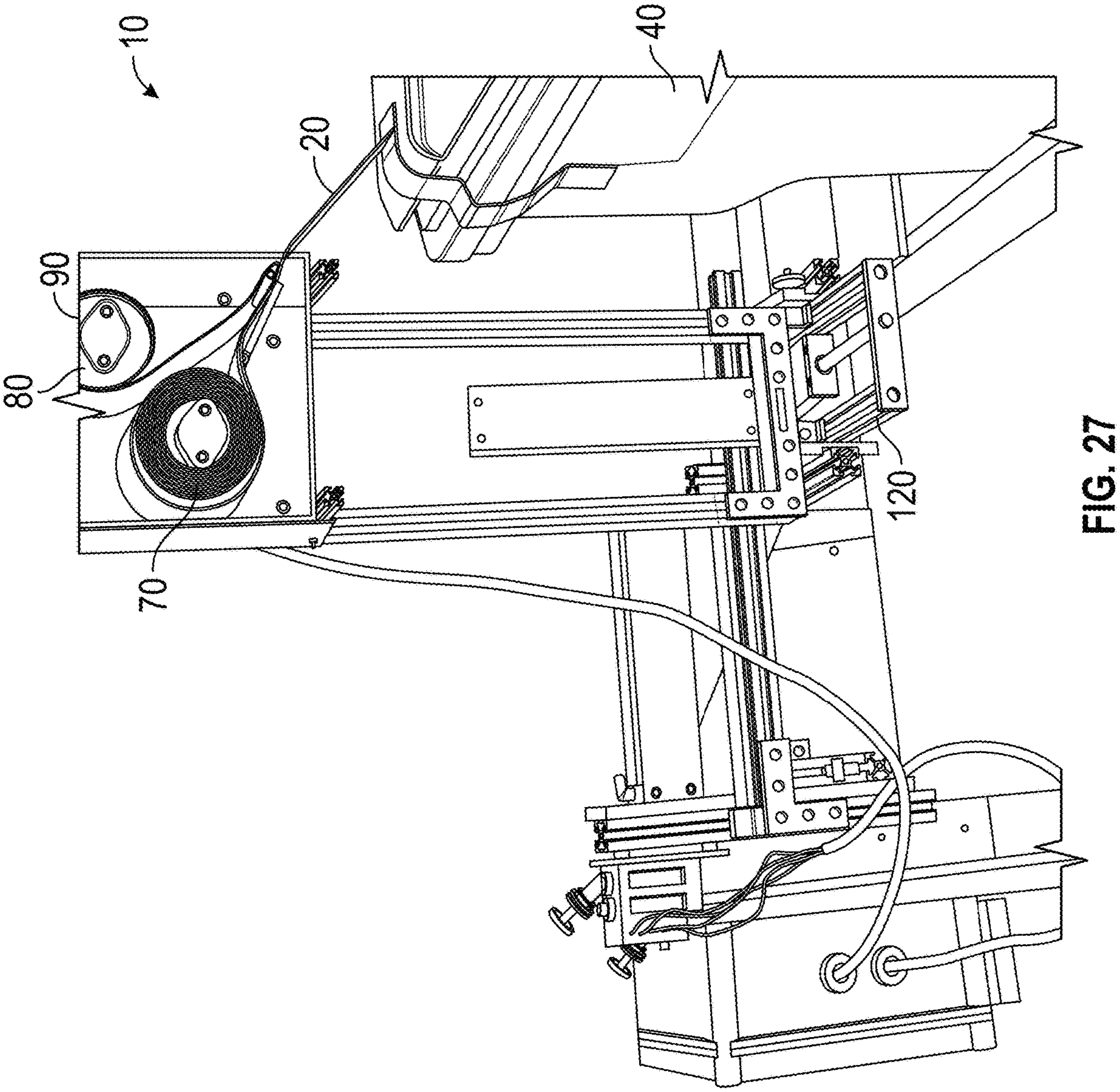
FIG. 27 is an illustration of an apparatus for applying labels to carts such as contaminated recycling carts in accordance with an illustrative embodiment of the presently disclosed subject matter.

Following this, cylinder would extend upward, spreading the rest of the sticker 20 across the side and lid 45 of the recycling cart 40 as seen in FIG. 26, which displays spreading of the sticker 20 across the recycling cart 40 including its lid 45 and body. Cylinder would then retract away from the recycling cart 40 slightly allowing the tongue 30 to bend upwards again as it is slid across the top of the lid 45, as seen in FIG. 27, as cylinder extends again, and the apparatus runs its tongue 30 over the recycling cart lid 45.

Cylinder then retracts downwards pressing the sticker 20 onto the recycling cart lid 35, and then extending upwards again as to avoid moving the sticker separator 110. After this final motion, cylinder retracts completely followed by cylinder retracting completely, while the sticker head rewinds the sticker rolls 70, 80 to the correct starting position. At this stage the apparatus 10 is ready to apply stickers 20 to other carts 40.

In various embodiments, the apparatus 10 can apply the sticker 20 to the side of the container 40, or to the top, or from the top to the side, or from the side to the top, as desired.

When the operator would like to dump the waste container 40 into the truck, the "In/Out" switch in FIG. 24 would need to be flipped to the "In" position. This will retract cylinder so that the mechanism will not interfere with the truck body 5 when the waste container 40 is dumped.

Figure 25:
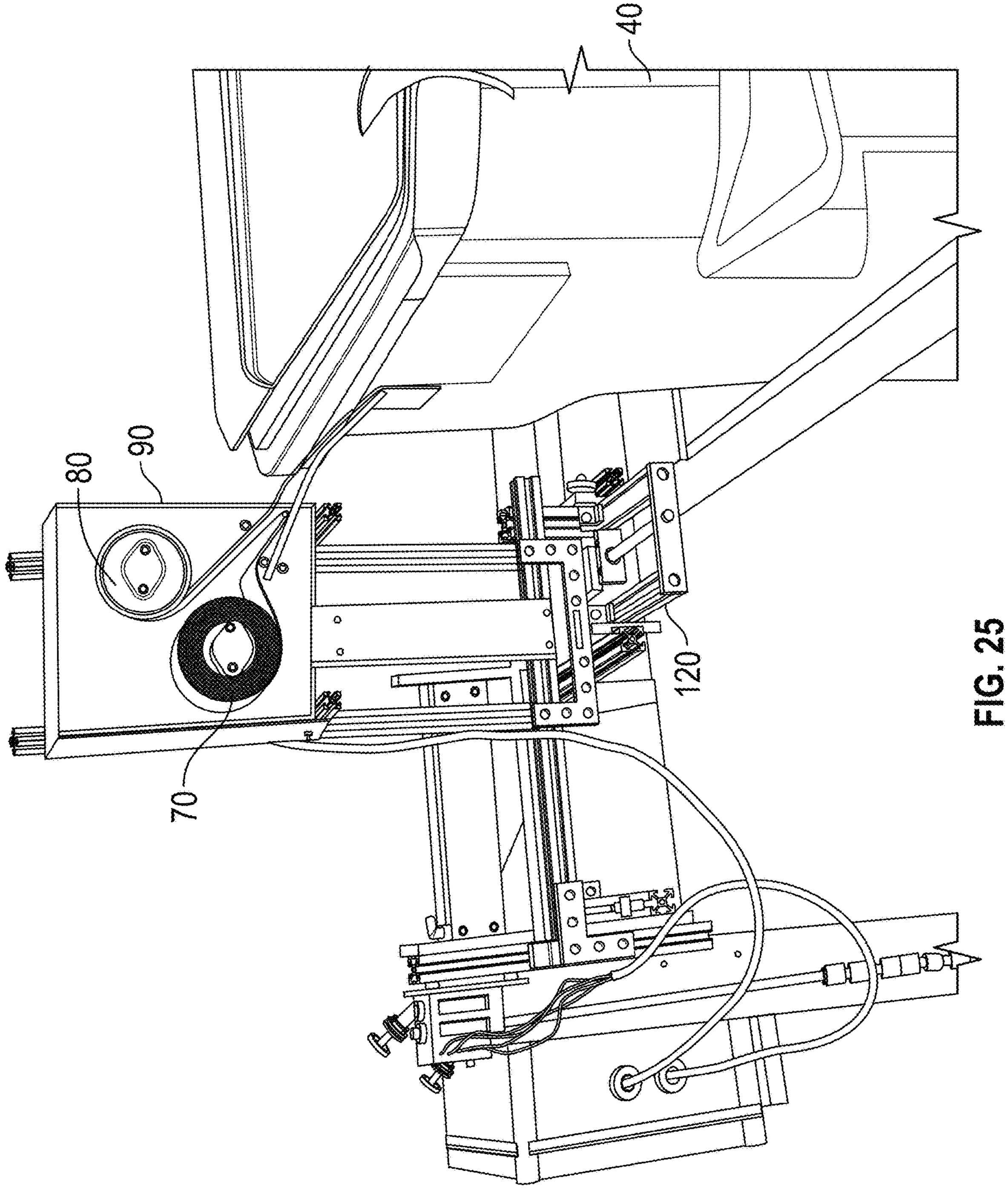
FIG. 25 is an illustration of an apparatus for applying labels to carts such as contaminated recycling carts in accordance with an illustrative embodiment of the presently disclosed subject matter.

Additional illustrations of the presently disclosed apparatus 10 are provided in FIGS. 25-27 hereto.

In certain illustrative embodiments, the presently disclosed apparatus and method have some or all of the following advantageous features:

1. Rapid Sticker Application: This metric is used to judge whether the apparatus is able to apply the sticker at a fast rate. A typical pick up time per stop is about 17 seconds. Preferably, the sticker application occurs simultaneously to normal pick up procedures and adds no more than 3 additional seconds, or a 17.6% increase to the pick up time, or the apparatus adds no more than 10 additional seconds to the stop, or a 58.8% increase to time.
2. Truck Dimension Constraints: This metric is a measure of how compact the apparatus would be when added to the dimensions of the trucks. The trucks often have to drive through tight spaces and the mechanism should not hinder this. The mechanism must fit within current truck and waste container space constraints.
3. Lid Closure: The apparatus must be able to close the lid before the time of application. Preferably, the apparatus can close the lid of the cart while the cart is still lifted in the air, or ensures that the lid of the cart is closed before applying a sticker.

4. Sticker Can Be Adhered To The Cart When The Lid Is Open: This metric is made to account for instances of extreme contamination, when contamination is obvious to the driver without dumping. The sticker must be able to be adhered to the cart if the lid is open.
5. Sticker Contacts Lid and Body: This metric is used to judge how well the sticker adheres to the lid and body of the cart. The removal of the sticker should be required, before the recycling cart lid can be opened.
6. Grabbing Position Variety: This metric requires that the can be able to be grabbed at any angle or height to complete the sticker application. The device should be able to successfully apply a sticker when the cart in grabbed from any angle or height variance. Preferably, the device will be able to operate and apply the sticker within 1 foot of variance, 6 inches up or down, from a standard grab.
7. Frequency of Part Repair/Replacement: This metric is a measure of how robust or durable the apparatus is predicted to be. This includes wear from weather and mechanical wear. Preferably, the device could be serviced at the same rate of the rest of the truck, every 50 hours of operation, or about every five days, if needed.
8. Failure Rate of Sticker Application: This metric takes into account the likeliness of a sticker application failure based on, for example, the amount of exposed adhesive, and complexity of the apparatus. Preferably, the device will only have a failure once during a run, which can be up to 2000 stops, or one out of every 2000 applications or a 0.1% failure rate.
9. Resistance to Recycling Buildup: This metric judges whether the mechanism can resist becoming jammed due to recycling falling on or around the mechanism. The apparatus should be unhindered by recycling debris, and can operate through an entire day before recycling debris would need to be cleared. Preferably, the device would be able to operate over an entirely serviced residential route before needing to be cleared of debris.
10. Simple User Input: This metric is for the truck operators. The operational mechanism should be a simple addition to existing operational requirements Preferably, the device will only require a one or two button control system.
11. Sticker Roll Replacement: This metric defines if the apparatus would be able to hold enough stickers to get through a route, and allow for easy access for changing the stickers as well. Preferably, the device will only require daily replacement of sticker rolls.
12. Operational in Adverse Weather Conditions: This metric takes into account whether the apparatus would be able to operate and adhere in various weather conditions. Preferably, the device can operate, and the sticker will adhere, in all weather conditions.

In certain illustrative embodiments, application of the stickers to the recycling carts should be capable of being performed "over a corner," that is, over the lid and onto the side of the cart. The purpose of this application is to prevent the lid from being opened, so that the customer is required to remove and examine the sticker. Due to the customer having to physically take off the sticker in order to use the cart again, this makes it more likely that the information on the sticker will be communicated to the customer. Customers would also prefer stickers that are easy to remove from their carts. If these stickers are effective, customers would become educated and would be more likely to recycle accurately.

In certain illustrative embodiments, placing the sticker over the lid to prevent it from being opened without removal will be critical. Therefore, the lid must be closed when the sticker is applied. The lids of the carts are frequently left open after being dumped. The apparatus and method should preferably return the lid to a closed position after it has been dumped, in certain illustrative embodiments. This would also provide the added benefit of keeping carts free of water collection during weather events. The lid containment arm, a.k.a. the lid stick assembly, is designed to achieve this desired functionality.

The presently disclosed apparatus and method has a number of benefits. For example, a mechanism that can apply a sticker to recycling carts quickly without interfering with the process of collecting recycling would save the operator time and money. Operators would be able to apply the sticker without leaving the truck and would be able to complete the tagging process on a regular recycling route. Successful tagging of contaminated recycling carts would make it more likely for customers to be informed and adjust their recycling habits. The primary user, the truck operators, should be able to activate the mechanism simply from inside the truck. Use of the mechanism should require less time than if the operator were to get out of the truck and physically apply the sticker. Also, the mechanism is robust and able to withstand heavy usage. It is able to apply stickers quickly and easily so as not to interfere with the truck operator's schedule or typical recycling routine. The device also ensures that the recycling can lid is closed before sticker application, when desired. In certain illustrative embodiments, the apparatus is designed to conform to certain space constraints for different truck designs. This includes extensions off the sides of the trucks, and off of the lifting mechanism of the truck. In addition, if the truck arm lifts the container up and over the cab of the truck, to rest on top of the hopper opening of the truck, the sticker application mechanism must still fit within the space constraints of the hopper opening.

In certain illustrative embodiments, the apparatus can conform to certain worker constraints, e.g., how the truck operators perform their jobs. For example, the sticker application system can be robust and able to withstand aggressive operating conditions. The sticker application system can also add a minimal amount of time to the truck operator's stops. Also, the drivers operate in tight residential streets, so any additional hardware should be as close to the truck as possible. Further, the recycling carts are not always picked up in a consistent manner, and this could be an issue for sticker application. Finally, the truck drivers are used to operating buttons and levers to actuate the truck's mechanisms, and the same can be utilized for a sticker application mechanism.

In certain illustrative embodiments, the presently disclosed system and method can also include software that connects to other onboard unit devices to provide desired operational information. For example, the onboard devices can display information such as the location of where tags were dispensed, the number of stickers that have been dispensed, the number of stickers that are remaining, and warnings for situations that potentially could create errors.

In certain illustrative embodiments, the stickers can be applied with informative messaging directed to the user, such as the carts are not far enough apart for collection, material is left on the ground, service messaging, etc.

It is to be understood that the present invention is not limited to the embodiment(s) described above and illustrated herein, but encompasses any and all variations falling within the scope of the appended claims.

What is claimed is:

1. A waste collection vehicle assembly, comprising:

a waste collection vehicle having a front end, a side adjacent to the front end, a rear end, and a container lift arm operatively attached to the side and configured for side loading; and a labeling apparatus attached to the side of the waste collection vehicle and configured to dispense a label for application to a waste container during waste collection operations, the labeling apparatus comprising:

an xyz-positioner;

a labeling dispenser, wherein the labeling dispenser is disposed on the xyz-positioner and wherein the xyz-positioner is configured to move the labeling dispenser along x, y, and z coordinates and into proximity with a waste container during operations of the waste collection vehicle such that the label can be applied to the waste container; and a horizontal actuator connected to both the waste collection vehicle and the labeling apparatus and configured to retract the labeling apparatus towards the waste collection vehicle and away from the container lift arm during lift arm operations.

2. The waste collection vehicle assembly of claim 1, wherein the waste container comprises one or more of a garbage container, a recycling container, an organics container, and a yard waste container.

3. A method of applying a label to a waste container from a waste collection vehicle during waste collection operations, comprising:

positioning the waste collection vehicle adjacent the waste container, wherein the waste collection vehicle has a front end, a side adjacent to the front end, a rear end, and a container lift arm operatively attached to the side and configured for side loading, and wherein the container lift arm is adjacent the waste container;

extending a labeling apparatus from the side of the waste collection vehicle towards the waste container, the labeling apparatus comprising an xyz-positioner and a labeling dispenser;

moving the labeling dispenser along x, y, and z coordinates and into proximity with the waste container using the xyz-positioner;

dispensing a label from the labeling dispenser;

applying the label to both a lid and a side wall of the waste container; and retracting the labeling dispenser towards the side of the waste container vehicle and away from the container lift arm during lift arm operations.

* * * * *